US009955206B2

United States Patent
Jones et al.

(10) Patent No.: US 9,955,206 B2
(45) Date of Patent: Apr. 24, 2018

(54) VIDEO SYNCHRONIZED MERCHANDISING SYSTEMS AND METHODS

(75) Inventors: Anthony E. Jones, Chicago, IL (US); Evan M. Ruff, Atlanta, GA (US)

(73) Assignee: THE RELAY GROUP COMPANY, Santa Monica, CA (US)

( * ) Notice: Subject to any disclaimer, the term of this patent is extended or adjusted under 35 U.S.C. 154(b) by 0 days.

(21) Appl. No.: 12/916,157

(22) Filed: Oct. 29, 2010

(65) Prior Publication Data
US 2011/0162002 A1 Jun. 30, 2011

Related U.S. Application Data

(60) Provisional application No. 61/261,288, filed on Nov. 13, 2009.

(51) Int. Cl.
*H04N 7/173* (2011.01)
*H04N 21/414* (2011.01)
(Continued)

(52) U.S. Cl.
CPC ....... *H04N 21/41407* (2013.01); *G06Q 30/02* (2013.01); *G06Q 30/0241* (2013.01);
(Continued)

(58) Field of Classification Search
CPC ....... H04N 21/41407; H04N 21/42204; H04N 21/4312; H04N 21/47815; H04N 21/812; G06C 30/02; G06C 30/0241
USPC ....... 725/32, 36, 37, 42, 105, 114, 115, 131, 725/133, 134, 139, 141, 142, 151, 153; 705/14.4, 14.73, 27.1, 27.2; 424/32, 36, 424/37, 42, 105, 114, 115, 131, 133, 134, 424/139, 141, 142, 151, 153
See application file for complete search history.

(56) References Cited

U.S. PATENT DOCUMENTS 8,634,030 B2 * 1/2014 Hale et al. ..................... 348/734
8,666,528 B2 * 3/2014 Harkness et al. ............... 700/94
(Continued)

*Primary Examiner* — John Schnurr
(74) *Attorney, Agent, or Firm* — One LLP

(57) ABSTRACT

Systems and methods are disclosed for providing an interactive viewing experience. Viewers of a video program, a motion picture, or a live action broadcast may access information regarding products displayed in the video program, motion picture or live action broadcast, and, if desired, enter transactions to purchase the featured products that are displayed in the video program, motion picture or live action broadcast. The video program, motion picture, or live action broadcast is presented to viewers on a primary interface device such as a television, a video display monitor, a computer display, a projector projecting moving images onto a screen, or any other display device capable of receiving and displaying moving images. The featured products are purposefully placed in the various scenes of the video program motion picture, or live action broadcast so that they are prominently displayed when the video program, motion picture or live action broadcast presented to one or more viewers. A secondary interface presents information about the featured products as the featured products appear during the presentation of the video program, motion picture, or live action broadcast. The secondary interface further provides a mechanism by which viewers may purchase the featured products via the secondary interface.

42 Claims, 12 Drawing Sheets

(51) Int. Cl.
  *G06Q 30/02* (2012.01)
  *H04N 21/422* (2011.01)
  *H04N 21/431* (2011.01)
  *H04N 21/478* (2011.01)
  *H04N 21/81* (2011.01)

(52) U.S. Cl.
  CPC ... *H04N 21/42204* (2013.01); *H04N 21/4312* (2013.01); *H04N 21/47815* (2013.01); *H04N 21/812* (2013.01)

(56) References Cited

U.S. PATENT DOCUMENTS

2002/0162120 A1\* 10/2002 Mitchell ................... 725/135
2008/0134255 A1\* 6/2008 Ferris et al. ................ 725/62
2008/0163283 A1\* 7/2008 Tan et al. .................. 725/20
2009/0158322 A1\* 6/2009 Cope et al. ................. 725/36

\* cited by examiner

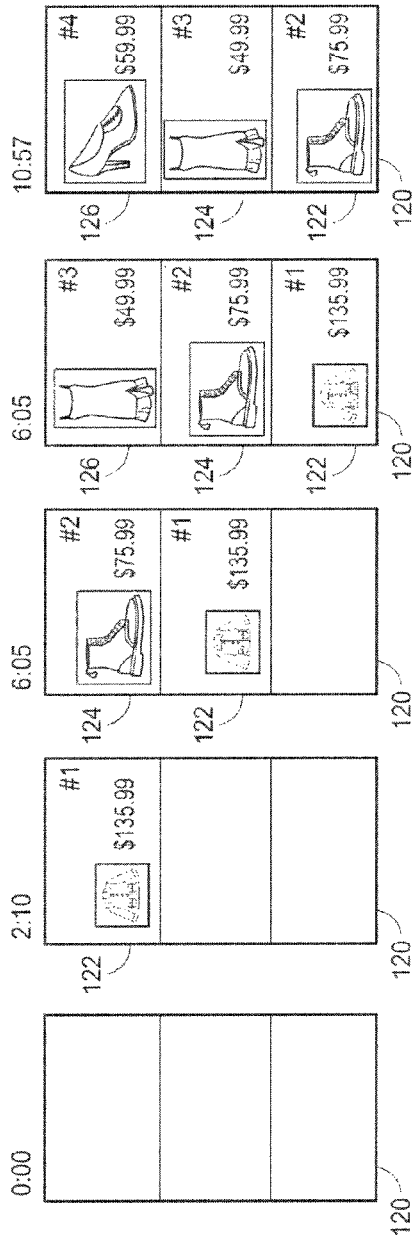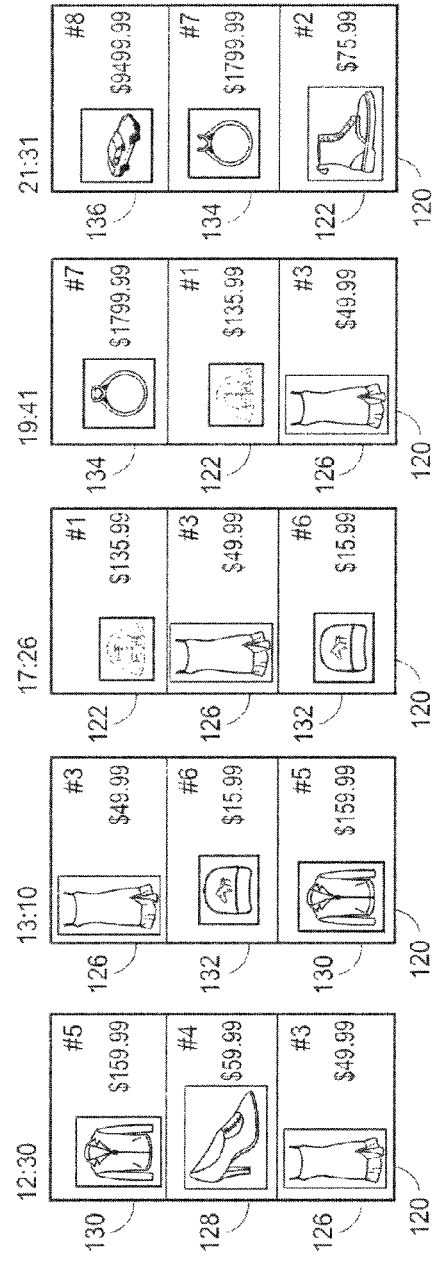

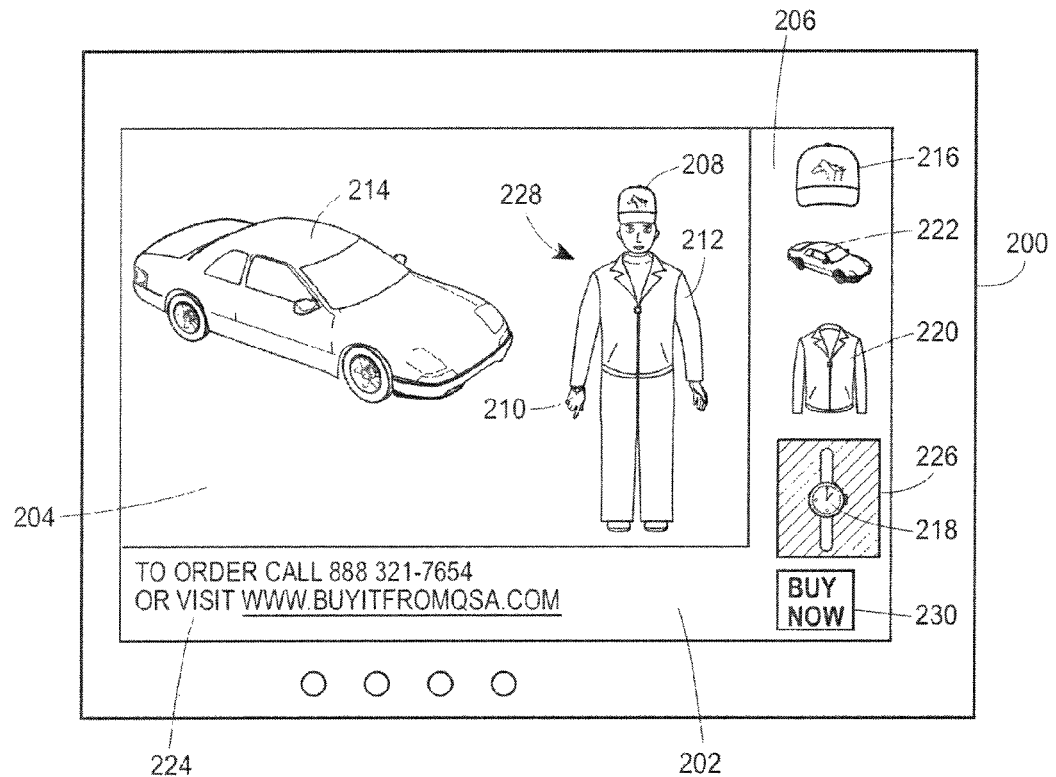
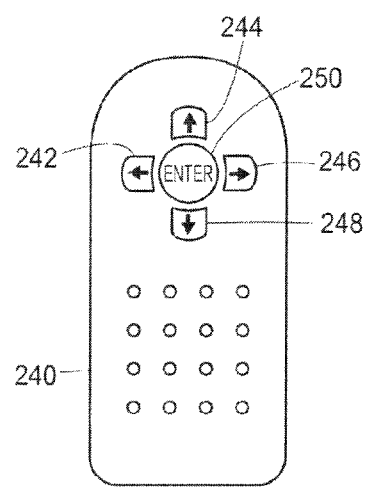
FIG. 5

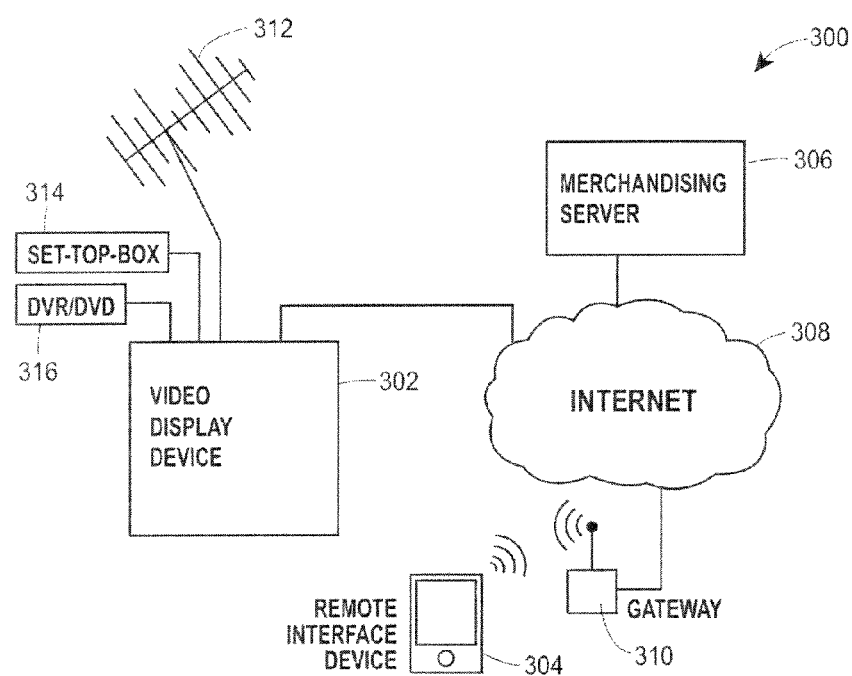
FIG. 6
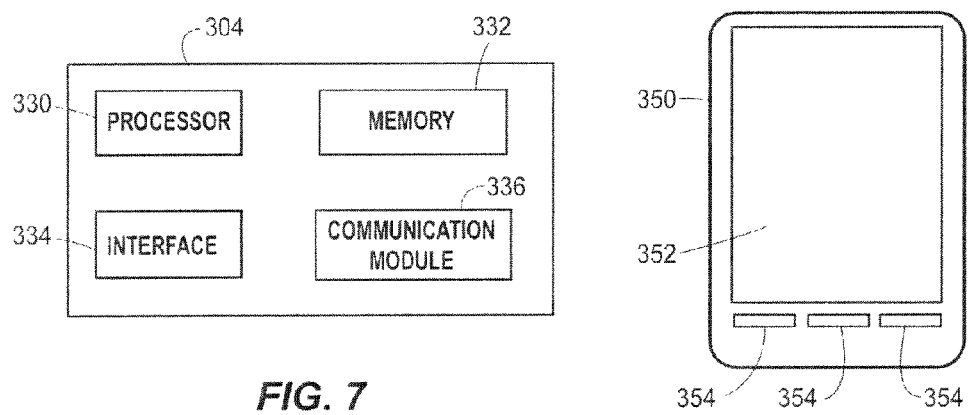
FIG. 7
FIG. 8

VIDEO SYNCHRONIZED MERCHANDISING SYSTEMS AND METHODS

CROSS-REFERENCE TO RELATED APPLICATION

This application claims the benefit of U.S. Application Ser. No. 61/261,288 entitled System and Method for Providing an Interactive Video Experience filed Nov. 13, 2009, the entirety of which is incorporated herein by reference.

BACKGROUND

Television and video has played an instrumental role in advertising and selling products almost from moment it was invented. Early television programs were directly sponsored individual advertisers. Often a celebrity host would make a live plug for the sponsor at the beginning and end of a sponsored broadcast. Occasionally programs would be interrupted with a pitch made in the middle of the show. Over time such direct sponsorship evolved into the 30 and 60 second commercials that present day viewers are all too familiar with. Today advertising provides significant revenue for television networks and their local affiliates.

For a TV commercial to be effective it must be viewed by a large number of people. The commercial must make a significant impression on viewers so that they will remember the advertised product, and must positively dispose viewers toward the product such that a significant number of viewers will be moved to purchase the product. For as long as television commercials have existed, however, TV viewers have sought to avoid them. Viewers often use commercial breaks to get up and do other things, from getting something to eat or drink, using the restroom, or taking with their friends and family. Thus, an important aspect of TV commercials has always been to make interesting enough to maintain the viewer's attention. Another technique has been to broadcast TV commercials broadcast at a higher volume so that viewers may still hear the commercial even if they have walked away from the Television set.

The proliferation of video cassette recorders (VCRs) in the 1970s and 1980s introduced the concept of time shifting. With a VCR a viewer was able to record a television program and watch it later. The VCR gave viewers complete control over the playback of recorded programs. Once a show was recorded it was a simple thing to fast forward through commercial breaks in order to view a recorded program substantially without interruption. Of course, allowing viewers to skip commercials prevents advertisers from delivering their messages, reducing the value of the 30 or 60 second spots broadcast during the program.

Digital technologies further threaten the effectiveness of traditional TV commercial advertising. Digital video recorders (DVRs) have made recording television programs even easier. Time shifting is more and more prevalent. Alternative methods of delivering digital video such DVDs and the internet also mean that viewers are watching fewer and fewer TV commercials. This trend is likely to accelerate as new platforms and devices for delivering and displaying video are introduced.

Product placement is an alternative form of video advertising that avoids some of problems of traditional TV commercials. According this method, advertisers pay the producers to include their products in television programs and movies. As people watch a television program or movie in which products have been placed they are exposed to the product through the natural course of the story. Since there is no formal interruption of the program people are less likely leave the room or fast forward through a recorded program when the advertised products appear. Of course product placement advertising has its own set of limitations. Since the products are placed within the program in the context of the storyline, it usually is not possible to single out the product to extol is virtues. Thus, product placement is most effective for well known products with recognizable trademarks and company logos. Product placement serves mainly to raise awareness of the products and to make positive associations with the products based on a positive identification with the characters and the character's life style.

Where television has traditionally been a one way form communication, the proliferation of new communications technologies including cellular telephone networks, the internet, Wi-Fi, Bluetooth, digital cable networks, and the like, make it easier for viewers to not only access video content from a wider range of content providers, it also makes it much easier for viewers to communicate with the content providers. The possibility of two way communications between the viewer and the content provider (or an entity associated with the content provider) opens up new opportunities for providing a more interactive video or motion picture viewing experience, including, among other things, opportunities to develop new and better techniques for advertising and merchandising products directly to consumers. It also makes it easier for advertisers to identify which products are of interest to consumers so that interactive advertising may be more sharply focused toward an individual consumer's known preferences, and to sell products directly to customers via their television or other communication interface.

SUMMARY

The present invention relates to systems and methods for providing an interactive viewing experience in which viewers of a video program, a motion picture, or a live action broadcast may access information regarding products or other items displayed in the video program, motion picture or live action broadcast, and if desired, enter into transactions to purchase the products or otherwise interact with the video program, motion picture or live action broadcast.

An embodiment provides a merchandising system for presenting and selling one or more products to consumers. The merchandising system includes a video display device, a remote display device, and a clock or timer for synchronizing the remote display device with a video program presented on the video display device. The video display device is adapted to present a video program that includes video images of one or more featured products. The video images of the one or more featured products appear at specific times relative to the elapsed video program a running time of a presentation of the video program. The remote display device includes a processor and a memory. The memory stores a software application that is executed by the processor to present a merchandising interface on the remote display device. A merchandising script corresponding to the video program identifies the products and the elapsed video program running times at which they appear in the video program when the program is presented to a viewer. The clock or timer synchronizes execution of the merchandising script with the running time of the video program such that the information about the one or more featured products is displayed on the remote display device at approximately the same time that images of the featured products appear in the presentation of the video program on the video display device.

According to another embodiment, a product merchandising system includes a video display device, a merchandising server, and a user interface device. The video display device is adapted to receive and present a video program. The video program includes video images of one or more products offered for sale via the merchandising system. The video images of the one or more products are displayed on the video display device during the presentation of the video program to a viewer. The merchandising server stores a merchandising script corresponding to the video program. The merchandising script identifies one or more product appearance times corresponding to one or more elapsed video running times at which the images of the one or more products offered for sale via the merchandising system appear in a presentation of the video program. The user interface device is communicatively coupled to the merchandising server via a network. The user interface device is adapted to execute an application for presenting a merchandising interface to a user. The application is configured to receive the merchandising script along with information about the one or more products offered for sale via the merchandising system from the merchandising server. Synchronization information for synchronizing operation of the merchandising interface with the presentation of the video program is also provided by the merchandising server to the application. Based on the merchandising script and the synchronization information, the merchandising interface displays information about the one or more products offered for sale via the merchandising system at substantially the same times at which the one or more products appear in a presentation of video program on the video display device.

Yet another embodiment of the invention provides a merchandising method for selling products appearing in a video program. The merchandising method includes creating a merchandising script corresponding to the video program, synchronizing the merchandising script with a presentation of the video program, displaying product information for the one or more products on a remote interface device according to the merchandising script, and providing a sales interface allowing a user to purchase one or more of the products via the remote interface device. According to this embodiment the merchandising script identifies one or more product appearance times corresponding to elapsed video program running times at which images of the one or more products appear in the video program when the video program is presented to a viewer. The product information for the one or more products is displayed on the remote interface device at the product appearance times according to the script, such that the product information for the one or more products appears on the remote interface device at times substantially corresponding to the video program running times at which the images of the one or more products appear in the presentation of the video program.

Still another embodiment provides a merchandising server. The merchandising server includes a processor, a database storing product information relating to a plurality of products and one or more video program merchandising scripts, and a computer readable medium storing instructions which, when executed by the processor, are adapted to cause the merchandising server to perform a number of steps. The steps performed by the server according to the instructions stored in the database include receiving a request from a remote client device over a network connection for one of the video program merchandising scripts, accessing the requested video program merchandising script from the database and sending the requested video program merchandising script to the remote client device over the network; accessing the product information relating to at least some of the plurality of products from the database, sending the product information to the remote client device, and processing a request to purchase one of the at least some of the plurality of products received from the remote client device over the network connection.

Yet another embodiment provides an interface device for interacting with a video synchronized merchandising system. The interface device includes a display screen for presenting information to a user and one or more inputs for receiving user input commands. The interface device further includes a processor, a memory and a network communication module. A merchandising interface application adapted to be executed by the processor is stored in the memory. When executed by the processor the merchandising interface application follows a merchandising script that is synchronized to the presentation of a video program on a video display device. By following the merchandising script the merchandising interface application displays product information relating to products appearing in the video program on the merchandising interface device display screen. The product information is displayed on the merchandising interface device at substantially the same time that images of the products appear in the video program.

Finally, according to yet another embodiment a method of merchandising a plurality of products that appear in a video program is disclosed. The method according to this embodiment includes storing information about the products in a memory and creating a merchandising script that identifies the elapsed video program running times at which images of the products appear in a presentation of the video program. The method further calls for synchronizing the merchandising script with a presentation of the video program. When the merchandising script is synchronized with the video program information about the products is displayed on an interface device according to the merchandising script such that information about the products is displayed on the interface device at times corresponding to the elapsed video running times at which images of the products appear during the presentation of the video program.

BRIEF DESCRIPTION OF THE DRAWINGS

FIGS. 4A-4J illustrate an example of a scrolling merchandising interface display for displaying product information.

FIG. 5 shows a video display device adapted to display both a video program and a merchandising interface.

FIG. 6 is a block diagram of a system for providing an interactive video experience in which a video program is displayed on a video display device and a synchronized merchandising interface is presented on a separate remote interface device.

FIG. 7 is a block diagram of a remote interface device for use in a system for providing an interactive video experience.

FIG. 8 is a diagram showing a smartphone adapted to operate as a remote interface device for use in a system for providing an interactive video experience.

DETAILED DESCRIPTION

The present invention relates to systems and methods for providing an interactive viewing experience in which viewers of a video program, a motion picture, or a live action broadcast may access information regarding products displayed in the video program, motion picture or live action broadcast, and, if desired, enter transactions to purchase the products displayed in the video program, motion picture or live action broadcast. (For the sake of brevity, the remainder of this disclosure will refer to a video program, a motion picture or a live action broadcast as simply "a video program," with the understanding that the various systems and methods of the present disclosure may be applied to any media platform for presenting moving images to one or more viewers.)

According to an embodiment a video program is produced for personal viewing by consumers. The video program may be screened in a movie theater or may broadcast to viewers over the public airways, via a cable TV network, via satellite transmission, as a streaming video session over the internet, or via any other transmission medium. For display on a television, a video monitor, a computer display or any other device capable of receiving and displaying video content. Alternatively, the video program may be distributed on DVD, video tape, or some other video recording medium.

A number of products are featured in the video program. The featured products are purposefully placed in the various scenes of the video program so that they are prominently displayed when the video program is presented to one or more viewers. The featured products may be offered for sale to viewers watching the video program. As the video program is presented to a viewer, a secondary interface presents information about the featured products as they appear during the presentation of the video program. According to an embodiment, the secondary interface comprises a merchandising interface which, in addition to displaying information about the featured products, also provides a communication channel by which the viewer may purchase one or more of the featured products. The secondary interface may comprise a video overlay that is broadcast or otherwise transmitted and displayed with the video program. In this case, the secondary interface may be manipulated via a television remote control device or other similar hand held controller. Alternatively, the secondary interface may comprise a software application executed on a computer, a mobile smartphone, a personal digital assistant (PDA), a slate computer such as an iPad®, or some other mobile or desktop computing device.

Figure 1:
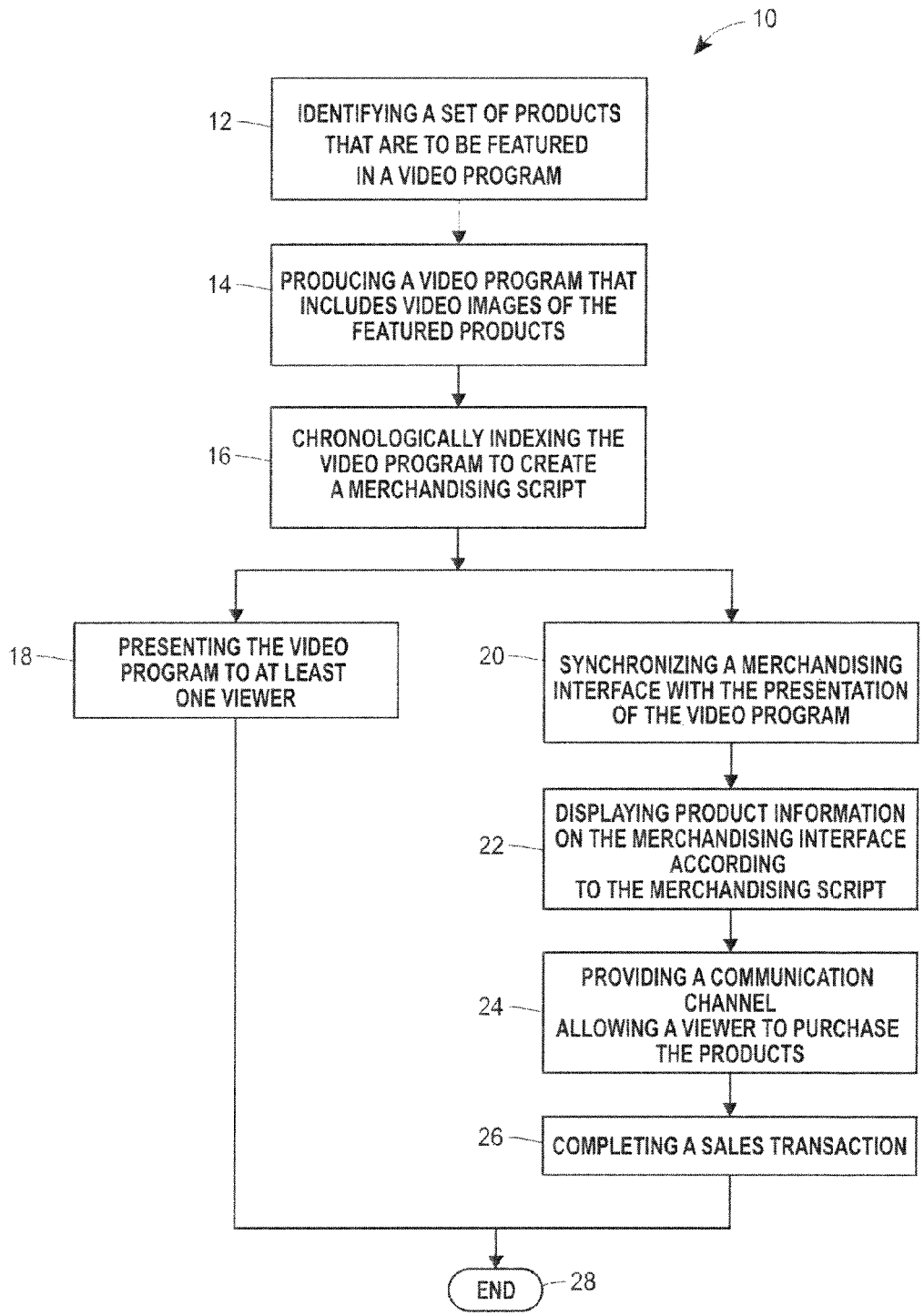
FIG. 1 is a flow chart showing a method for merchandising products via an interactive viewing experience.

FIG. 1 is a flow chart showing a method 10 for merchandising products via an interactive viewing experience according to an embodiment. The method 10 begins with creating a catalog of products that are to be featured in a video program at 12. The method then calls for producing a video program that includes video images of the featured products at 14. Preferably the featured products will be presented in a natural but prominent manner within the video program to improve the likelihood that the featured products will be noticed by viewers, but not in such an intrusive manner that placement of the products will interfere with the viewer's enjoyment of the video program. Alternatively, the catalog of featured products may be created after the video program has been created. In order to create a post production catalog, products that are to be offered for sale or otherwise featured via the interactive viewing experience must be identified and selected from products that happened to have been included in the previously produced video program. In any case, once the featured products have been identified and the video program has been produced, the final version of the video program is chronologically indexed at 16 to create a merchandising script that identifies the elapsed program video running times at which the featured products appear during presentation of the video program.

Once the video program has been produced and chronologically indexed, it may be presented to a viewer at 18. The merchandising interface is synchronized with the presentation of the video program and the merchandising script is executed by the merchandising interface device at 20. Synchronizing the merchandising interface with the presentation of the video program essentially amounts to synchronizing a merchandising interface clock or timer with the presentation of the video program and executing the merchandising script according to the merchandising timer. For example, when the merchandising interface timer has been synchronized with the presentation of the video program, the elapsed time measured by the merchandising interface timer will coincide with the elapsed program running time of the presentation of the video program. Alternatively, synchronizing the merchandising interface with the presentation of the video program may comprise starting execution of the merchandising script at an intermediate point coinciding with a known intermediate point within the presentation of the video program, such as at the beginning of a scene following a commercial break, or the like. As the video program is presented to the viewer, the merchandising interface presents product information relating to the featured products according to the merchandising script at 22. Since the merchandising interface is synchronized with the presentation of the video program, the information about the featured products is displayed on the merchandising interface at substantially the same time the featured products appear during the presentation of the video program. The merchandising interface further provides a communication channel at 24 allowing the viewer to enter a transaction to purchase one or more of the featured products via the merchandising interface. In some cases, depending on the manner in which the video program is distributed, the viewer initiating a sales transaction to purchase one of the featured products, or simply accessing additional information about a featured product, may act to pause the presentation of the video program while the sales transaction takes place, or while the viewer is viewing more detailed information about the featured product. The presentation of the video program may resume once the sales transaction is complete, or the viewer dismisses the product information via the merchandising interface. If the video transmission method is such that the presentation of the video program cannot be interrupted during the completion of the sales transaction, the presentation of the video program will continue while the viewer completes the sales transaction. In this case, if the presentation of the video program is still in progress at the completion of the transaction, the merchandising interface will continue displaying additional product information according to the merchandising script after the sales transaction is complete. Otherwise the merchandising method ends with the conclusion of the video program at 28.

Figure 2:
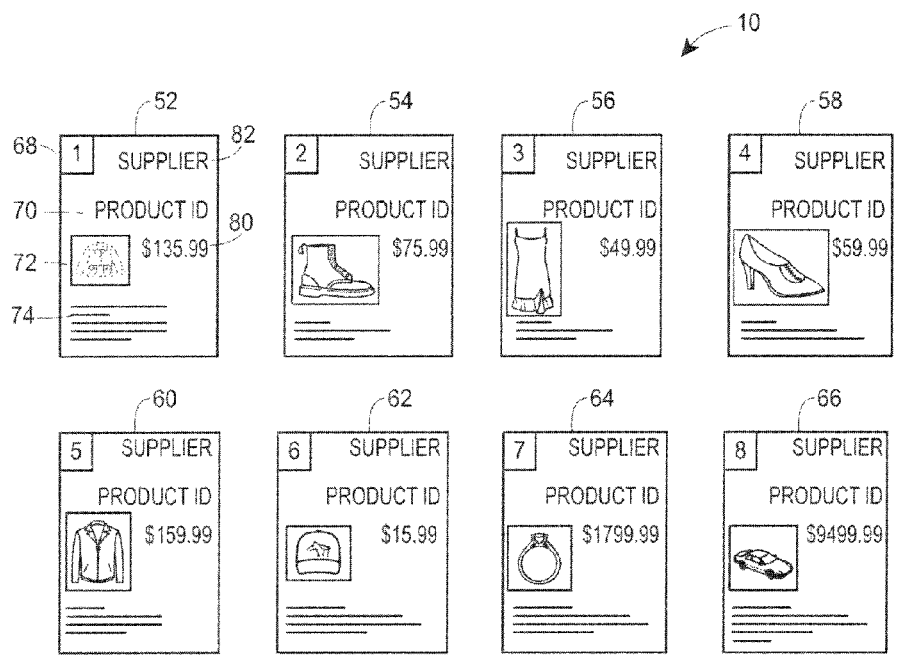
FIG. 2 is a diagram showing the pages or records of a product catalog including products featured in a video program.

FIG. 2 illustrates the elements of a product catalog 50 identifying a set of products to be featured in a video program. The product catalog 50 includes eight items, but it should be understood that a product catalog may include any number of products, including product catalogs having more than 8 products or product catalogs having fewer than 8 products. The products included in the product catalog 50 include an argyle sweater 52, a first pair of shoes 54, a white dress 56, a pair of sequin studded shoes 58, a black safari jacket 60, a baseball cap 62, a ring 64, and an automobile 66.

The product catalog essentially comprises a database of the products that are to be featured in a video program and which are to be available for purchase via the merchandising interface when the video program is presented. The product catalog 50 includes a catalog page (or data base record) 52-66 for each product to be featured in the video program. Each catalog page includes information about the product, including a catalog number 68, a product ID 70, digital image of the product 72 and a brief description of the product 74. The product image and the brief description of the product may be displayed by the merchandising interface when the corresponding image of the featured product appears the presentation of the video program. Each catalog page may also include a larger image more detailed image of the product 76, and a more detailed description of the product 78 both of which may be displayed by the merchandising interface when the viewer takes an action or enters an input command indicating an interest in the product. Additional information that may be stored in the catalog pages of the featured products may include the price of the product 80, and the name of the supplier of the product 82. Of course additional or different information about the products may also be included in the product pages of the product catalog 50 if desired.

As mentioned above, once the products featured in the video program have been identified and the featured product catalog has been compiled, the video program is produced with the featured products strategically placed in the various scenes of the video program. Placement of the featured products may include actors wearing selected articles of clothing or jewelry, physical items such as furniture, appliances, household items or business products being strategically placed in and around the set, actors handling or otherwise using the featured products, etc. When the final video program is produced, the featured products will be visible to the viewer as each scene unfolds during the presentation of the video program.

Chronologically indexing the video program is an important component in creating an interactive viewing experience. Chronologically indexing the video program requires identifying the elapsed program running time at which each of the featured products appear on screen when the video program is presented to viewers. The merchandising script that drives the merchandising interface is created based on the product appearance times identified when the video program is chronologically indexed.

Figure 3:
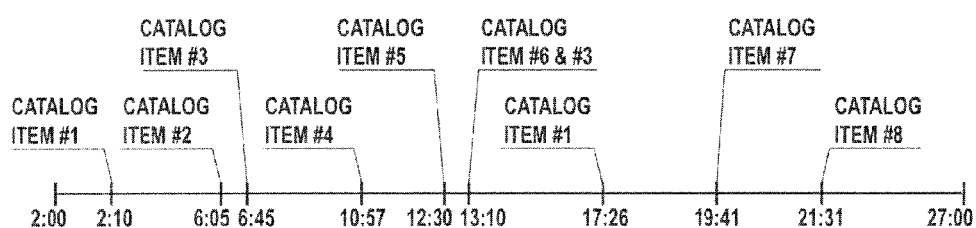
FIG. 3 is diagram representing a merchandising script.

FIG. 3 shows an example of a merchandising script 100. The merchandising script 100 is essentially a timeline representing the entire running time of the corresponding video program. The merchandising script 100 shown in FIG. 3 corresponds to a video program having a running time of 27 minutes. Thus, the merchandising script 100 runs from a program running time 0:00 104 corresponding to the beginning of the video program, to a program running time +27:00 106 corresponding to the end of the video program. In between are markers indicating the elapsed program running times at which the featured products appear in the video program. For example, product catalog item #1 (the argyle sweater) appears at an elapse video program running time of 2:10 108. Product catalog item #2 (the Dolce & Gabana shoes) appears at an elapsed program running time of 6:05 110. Product catalog item #3 (the white dress) appears at an elapsed program running time of +6:45 112, and so forth. Alternatively, the merchandising script may simply identify the elapsed program running time for the start of each scene in the video program and the particular catalog items that appear in each scene. With this arrangement, information about the various products that appear in each scene may be displayed on the secondary or merchandising interface at the beginning of the scene in the order in which they appear during the scene, and may be displayed for the entirety of the scene or even longer if desired. In a slight variation, the length of the scene may be divided between the number of products presented during the scene, and information about each of the products may be displayed on the secondary or merchandising interface for an equal length of time during the presentation of the scene. In yet another alternative, algorithms may be provide which extrapolate the display timing programmatically so that various products are each displayed for a predetermined amount of time, or for a predetermined percentage of the overall presentation time of the program or of a particular scene within the program.

Featured products may appear in the video program more than once, and multiple products may appear in the video program at the same time. For example, the merchandising script 100 indicates that catalog items #3 and #6 both appear at elapsed video running time the +13:10. This is the first time catalog item #6 appears in the video program, but it is the second time that catalog item #3 appears. The merchandising script continues marking the appearance of the various featured products until the end of the video program at the elapsed program running time of +27:00.

To provide an interactive video viewing experience the merchandising script 100 is used to drive a secondary or merchandising interface. As described above, the secondary or merchandising interface may comprise a video overlay that is presented on the same video display device as the video program and which is displayed along with the video program. Alternatively, the secondary or merchandising interface may be provided on a separate device such as a smartphone, PDA, desktop computer, laptop or slate computer, or the like, configured to operate in conjunction with the presentation of the video program on a primary interface device. Again, the primary interface device may comprise a television, a video monitor, a computer display screen, a movie or television projector, or any other device capable of presenting programs comprising moving images. Preferably the primary and secondary interfaces are visually separated from one another so that information presented on the secondary interface does not interfere with the presentation of the video program on the primary interface. There may be situations, however, where it is not possible or may not be desirable to physically separate the primary and secondary interfaces. In such cases, the primary and secondary interfaces may be combined in a manner such that the secondary interface interferes with the presentation of the video program presented on the primary interface as little as possible.

As described with regard to steps 18 and 20 of the flowchart of FIG. 1, the merchandising interface is synchronized with the video program when the video program is presented to a viewer. Synchronizing the merchandising interface with the presentation of the video program essentially requires executing the merchandising script at the same time and at the same speed as the video program. Synchronizing the merchandising interface with the presentation of the video program may comprise, for example, starting a timer associated with the merchandising interface at the same time that the presentation of the video program is begun. Maintaining synchronization between the video program and the merchandising interface may require starting or stopping the merchandising interface timer when the video program is paused or stopped and restarting the merchandising interface timer when presentation of the video program is resumed. The video program may include markers for re-synchronizing the merchandising interface clock during the course of presenting the video program if, for some reason, the merchandising interface loses synchronization with the presentation of the video program.

As has been described, the secondary or merchandising interface is provided to present product information about the featured products at approximately the same time that the featured products appear in the video program when the video program is presented to a viewer. When the merchandising interface is synchronized with the presentation of the video program, the merchandising interface need only display the information about the featured products at the elapsed program running times indicated in the merchandising script. Thus, for example, the merchandising script indicates that catalog item #1 appears in the video program at +2:10 of the elapsed program running time of a presentation of the video program. Since the merchandising interface timer is synchronized with the presentation of the video program, +2:10 mark on the merchandising interface timer will substantially coincide with +2:10 of the elapsed program running time of the presentation of the video program. When the merchandising interface displays an image and brief description of catalog item #1 (the argyle sweater) at the +2:10 mark on the merchandising interface timer, the image and brief description of catalog item #1 will appear on the merchandising interface at substantially the same time that an image the argyle sweater (e.g. a character wearing the sweater) appears in the presentation of the video program.

According to the merchandising script 100, catalog item #2 (the pair of Dolce & Gabana shoes) is the next item to be displayed by the merchandising interface. The Dolce & Gabana shoes are to be displayed at the +6:05 mark of the running merchandising interface timer. Again, since the running merchandising interface timer is synchronized with the presentation of the video program, the running time of the merchandising interface timer is substantially same as the elapsed program running time of the video program. Thus, when the merchandising interface displays the image and brief description of catalog item #2 at the +6:05 mark of the running merchandising interface timer, the image and brief description of catalog item #2 appear on the merchandising interface display at approximately the same time that a character wearing a pair of the same Dolce & Gabana shoes appears in the presentation of the video program.

Depending on the on-screen action of the video program, editing cuts and the like, the various products in the product catalog, may appear in the video program only briefly, and may or may not return to the screen shortly thereafter. In some cases the featured products may not stay on the screen long enough for viewers to consider the products at length. Therefore, it may be desirable for the merchandising interface to present information about the featured products for a length of time that exceeds the length of time that the featured products actually appear on-screen during the presentation of the video program. In order for information about a featured product to persist beyond the length of time that the corresponding product appears in the video program, the merchandising interface may implement a scrolling feature that allows information about a number of featured products to be displayed at the same time.

According to an embodiment a scrolling merchandising interface display may be employed. Information about a first featured product may be displayed in a persistent manner at the top of a product information display stack until it is displaced by the subsequent display of information about a next featured product that is be displayed by the merchandising interface at a time after the information about the first featured product is displayed. The product information about the next featured product is then displayed at the top of the product information display stack, and the product information about the first featured product is moved to a next lower position in the product information display stack. Thus, the product information about the first product is still displayed even though the display of information about a different product has taken precedence. In this way, information about the various featured products may remain displayed on the merchandising interface display 120 for a substantial length of time, allowing the viewer to absorb the information about the product and to make a decision as to whether or not to buy the product or to access additional information about the product.

FIGS. 4A-4J illustrate an example of a scrolling merchandising interface display 120 in which product information is displayed according to a merchandising script such as merchandising script 100 shown in FIG. 3. FIG. 4A shows the merchandising interface display 120 at a merchandising interface timer running time of less than +2:10. FIG. 4B shows the merchandising interface display 120 at a merchandising interface timer running time of 2:10. FIG. 4C shows the merchandising interface display 120 at a merchandising interface timer running time of +6:05. FIG. 4D shows the merchandising interface display 120 at a merchandising interface timer running time of +6:45. FIG. 4E shows the merchandising interface display 120 at a merchandising interface timer running time of +10:57. FIG. 4F shows the merchandising interface display 120 at a merchandising interface timer running time of +12:30. FIG. 4G shows the merchandising interface display 120 at a merchandising interface timer running time of +13:10. FIG. 4H shows the merchandising interface display 120 at a merchandising interface timer running time of +17:26. FIG. 4I shows the merchandising interface display 120 at a merchandising interface timer running time of +19:41. Finally, FIG. 4J shows the merchandising interface display 120 at a merchandising interface timer running time of +21:31.

When the merchandising script 100 is executed, the first featured product to be displayed by the merchandising interface 120 is catalog item #1, which is to be displayed at a merchandising interface timer running time of +2:10.

Since FIG. 4A represents the merchandising interface display 120 at a merchandising interface timer running time of less than +2:10, no product information has yet been displayed, and the merchandising interface display 120 remains blank. As shown in FIG. 4B, product information about catalog item #1 122 is displayed by the merchandising interface at a merchandising interface timer running time of +2:10. The product information about catalog item #1 122 is shown in a topmost position of the product information display stack.

According to the merchandising script 100, product information about catalog item #2 is to be displayed at a merchandising interface timer running time of +6:05. Thus, FIG. 4C, which shows the merchandising interface 120 at a merchandising interface timer running time of +6:05, includes product information about catalog item #2 124 in the topmost position of the product information display stack. The product information about catalog item #1 122 is also displayed on the merchandising interface display, but in the next lower position of the product information display stack.

Next, according to the merchandising script 100, product information about catalog item #3 is to be displayed at a merchandising interface timer running time of +6:45. Thus, FIG. 4D, which shows the merchandising interface 120 at a merchandising interface timer running time of +6:45, includes product information about catalog item #3 126 in the topmost position of the product information display stack. The product information about catalog items #1 and #2 122, 124 is also displayed on the merchandising interface display 120, but in the next lower positions in the product information display stack.

Product information about catalog item #4 is to be displayed at a merchandising interface timer running time of +10:57. Thus, FIG. 4E, which shows the merchandising interface 120 at a merchandising interface timer running time of +10:57, includes product information about catalog item #4 128 in the topmost position of the product information display stack. The product information about catalog items #2 and #3 124, 126 is also displayed on the merchandising interface display 120, but in the next lower positions in the product information display stack. In the embodiment of a scrolling merchandising interface display shown in FIGS. 4A-4J includes a three position display stack. There is only enough room to display information about three catalog items at one time. Thus, at the merchandising interface timer running time of +10:57 the product information 122 about catalog item #1 has been bumped from the merchandising interface display 120 and does not appear.

At a merchandising interface timer running time of +12:30 information about catalog item #5 130 is displayed in the topmost position of the product information display stack as shown in FIG. 4F. The product information about catalog items #3 and #4 126, 128 is also displayed on the merchandising interface display 120, but in the next lower positions in the product information display stack. The product information 124 about catalog item #2 124 has been bumped from the merchandising interface display 120 and does not appear.

According to the merchandising script 100, product information about catalog items #3 and #6 are to displayed at a merchandising interface timer running time of +13:10. FIG. 4G shows the merchandising interface 120 at a merchandising interface timer running time of +13:10. Since product information about both catalog items #3 and #6 are to be displayed at the +13:10 mark of the merchandising interface timer running time, product information about catalog items #3 and #6 126, 132 is shown in the top two positions of the product information display stack. Product information about catalog item #5 130 is shown in the lowermost position of the product information display stack.

At a merchandising interface timer running time of +17:26 information about catalog item #1 122 is again displayed in the topmost position of the product information display stack as shown in FIG. 4H. The product information about catalog items #3 and #6 126, 132 is also displayed on the merchandising interface display 120, but in the next lower positions in the product information display stack. The product information about catalog item #5 130 has been bumped from the merchandising interface display 120 and does not appear.

Next, according to the merchandising script 100, product information about catalog item #7 is to be to displayed at a merchandising interface timer running time of +19:41. FIG. 4I shows the merchandising interface 120 at a merchandising interface timer running time of +19:41. Information about catalog item #7 134 is displayed in the topmost position of the product information display stack as shown in FIG. 4I. The product information about catalog items #1 and #3 122, 126 is also displayed on the merchandising interface display 120, but in the next lower positions in the product information display stack. The product information about catalog item #6 132 has been bumped from the merchandising interface display 120 and does not appear.

Finally, according to the merchandising script 100, product information about catalog item #8 136 is to be to displayed at a merchandising interface timer running time of +21:31. FIG. 4J shows the merchandising interface 120 at a merchandising interface timer running time of +13:10. Information about catalog item #8 136 is displayed in the topmost position of the product information display stack as shown in FIG. 4J. The product information about catalog items #7 and #1 134, 122 is also displayed on the merchandising interface display 120, but in the next lower positions in the product information display stack. The product information about catalog item #3 126 has been bumped from the merchandising interface display 120 and does not appear.

As mentioned above, the secondary or merchandising interface may be provided in a number of different ways. According to a first embodiment, for example, an interactive video presentation system provides a merchandising interface in the form of a video overlay that is presented on the same video display device as the video program. FIG. 5 shows a video display device 200 adapted to display both a video program and a merchandising interface. The video display device 200 may comprise a consumer television set, a video monitor, a computer display, or some other display device capable of receiving video content and presenting video content to a viewer. The video display device includes a relatively large display area 202 for presenting information including the video content. According to the embodiment shown in FIG. 5, the display area 202 is divided between a primary interface or video display area 204 and secondary or merchandising interface area 206. As shown in FIG. 5 the video display area 204 is reduced in sized so that it does not fill the entire display area 202, allowing room on the display area 202 for the merchandising area 206. Since the merchandising area 206 does not overlay the video display area 204, information may be displayed in the merchandising area 206 without interfering with the video program presented in the video display area 204. In the embodiment shown in FIG. 5, the video display area 204 and the merchandising interface 206 are arranged such that the merchandising interface 206 frames video display area 204 on two sides. Alternative arrangements are also possible. For example, the video display area 204 may be made to cover the entire display area 202 and the merchandising interface may comprise a translucent overlay that is displayed directly over a portion of the video display area 204. Alternatively, the merchandising interface 206 may comprise a moving scroll bar displayed along the top or bottom edge of the video display area 204. Any number of alternative arrangements are possible without deviating from the inventive concepts of the present disclosure.

In any case, the merchandising interface area 206 is provided to display product information associated with products that appear in the video program presented in the video display area 204. For example, FIG. 5 shows a single frame from a video program displayed on the video display device 200. The displayed video frame provides an image of an actor 228 standing next to a vehicle 214. The actor is wearing among other things, a baseball cap 208, a watch 210, and a jacket 212. The baseball cap 208, the watch 210, the jacket 212 and the vehicle 214 are all featured products which have been purposefully placed in the video program and which are intended to be offered for sale via the merchandising interface displayed in the merchandising interface display area 206.

As can be seen, when the video frame image shown in FIG. 5 is displayed in the video display area, the merchandising interface area 206 displays images and brief descriptions of the baseball cap 216, the watch 218, the jacket 220, and the vehicle 222. The images and brief descriptions of the featured products may be displayed in the merchandising interface area 206 in a scrolling manner according to a merchandising script that has been created by chronologically indexing the video program being presented in the video display are 204 as described above. The merchandising interface area 206 may also display instructions for purchasing one or more of the featured products. For example, the merchandising interface area 206 shown in FIG. 5 includes a message 224 including a telephone number to call to purchase one or more of the featured products.

Alternatively, a remote control device 240 may be provided for interacting with the merchandising interface displayed in the merchandising interface area 206. The remote control device 240 may comprise a typical television or set-top-box remote control device. The remote control device 240 include up/down/left/right navigation keys 242, 244, 246, and 248, for maneuvering a cursor 226 around the merchandising interface area 206, and a select button 250 for selecting the product or item displayed by the merchandising interface area and highlighted by the cursor 226. According to an embodiment of an interactive synchronized video merchandising system, a viewer may access additional information about featured products by maneuvering the cursor 226 over the image of the desired product displayed in merchandising interface display area 206 and pressing the "select" or "enter" button 250 on the remote control device 240 to access the additional information. A larger picture and more detailed description of the selected product may then be displayed in the merchandising interface display area 206.

If the video program is transmitted to the video display device by a transmission system that includes a reverse communication channel for communicating user commands from the video display device 200, or a set-top-box associated with the video display device 200, to equipment associated with the video source, an interactive "Buy Now" button 230 may be included in the merchandising interface area 206 to allow a user to initiate a transaction to purchase one or more of the featured products displayed in the merchandising interface area 206. Selecting the "Buy Now" button 230 may cause a signal to be transmitted to back-end order entry equipment over the reverse communication channel to initiate a purchase transaction on the viewer's behalf for the selected item.

In another embodiment the secondary or merchandising interface may be provided on remote device separate from the video display device on which the video program is presented to the viewer. For example, a merchandising interface or an interface for some other purpose may be provided by a software application executed on a smartphone, a slate or tablet computer, a laptop computer, or some other generally portable intelligent device having a display on which information about products featured in a video program may be presented to viewers of as viewers watch a presentation of the video program on a separate video display device.

FIG. 6 shows a block diagram of an embodiment of a system for providing an interactive video experience in which a video program is displayed on a video display device 302 and a synchronized merchandising interface is presented on a separate remote interface device 304. As has already been described, the remote interface device 304 may be a PDA, a smartphone, a slate or tablet computer, a laptop computer, a desktop computer, or some other intelligent device having a graphic display and sufficient processing power to execute a software application for presenting a merchandising interface such as the merchandising interface described above. In addition to the video display device 302 and the remote interface device 304, the system 300 further includes a merchandising server 306 for providing merchandising information to the remote interface device 304 via a network 308 such as the internet. The remote interface device 304 may be adapted to communicate over the network 308 via a wireless gateway 310. The wireless gateway 310 may be, for example, a Wi-Fi wireless router, a cellular telephone network gateway, or some other wireless platform for communicating with the remote interface device 304 over a wireless link and connecting the remote interface device 304 with the network 308.

The video display device 302 is adapted to receive a video program and to display the video program to a viewer. The video display device 302 may be adapted to receive the video program from a variety of video sources. For example, the video display device 302 may receive a video program over the public airways via an appropriately tuned TV antenna 312, via community access television system (CATV) or some other dedicated cable TV system via. A set-top-box 314 or some other intelligent or semi-intelligent device provided for decoding received cable TV transmissions and presenting the received video content on the video display device 302. The video display device may also receive video programming from a digital video recorder (DVR) 316, a digital versatile disc (DVD) player, a video tape player, or some other device capable of storing and presenting video programming on demand. Finally, video programs may also be received via the internet or some other packet switched network having sufficient bandwidth to deliver high quality video signals to the video display device.

FIG. 7 is a block diagram of a remote interface device 304 according to an embodiment of a system for providing an interactive video experience. The remote device 304 includes a processor 330, a memory 332, a user interface 334, and a communication module 336. The user interface 334 includes a visual display for presenting information to a user and one or more inputs for receiving commands from the user. The memory 332 stores a software application which, when executed by the processor 330, interacts with the merchandising server 306 to present a merchandising interface on the visual display user interface 334. The communication module allows the remote device 304 to communicate with the merchandising server 304 via the wireless gateway 310 and the network 308.

FIG. 8 shows a smartphone 350 adapted to operate as a remote interface device for use in a system for providing an interactive video experience. The smartphone 350 includes a display screen 352 and one or more input buttons 354 for receiving user input for interacting with the smartphone 350. The display screen 352 may be a touch screen display for receiving additional input commands. The smartphone includes a processor 330 and a memory 332 as described above with regard to FIG. 7. The memory stores instructions to be executed by the processor to present a merchandising interface on the display screen 352. The smartphone 350 may be equipped to communicate with the wireless gateway 310 via a Bluetooth connection, a Wi-Fi connection, a 3G or 4G cellular connection, or some other wireless commercial protocol.

Figure 9A:
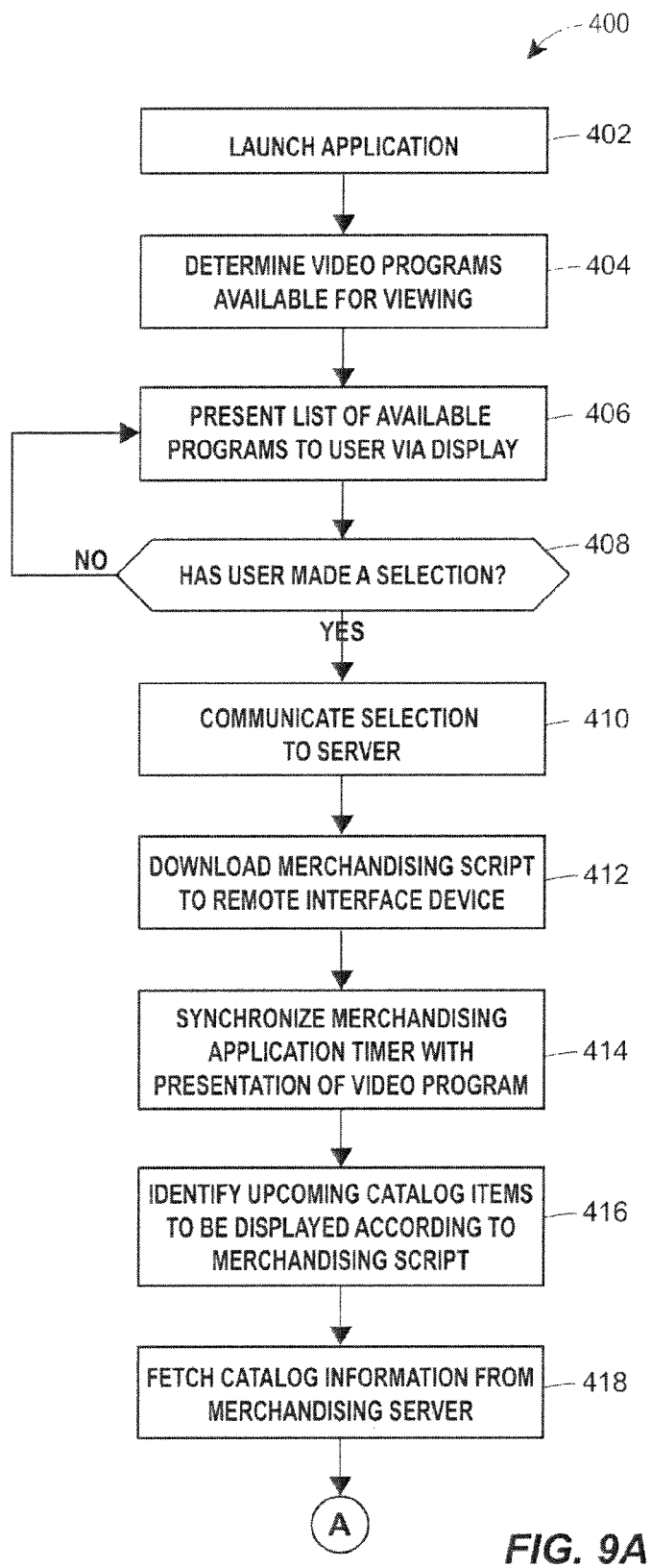
FIGS. 9A and 9B show a flow chart illustrating the operation of a software application executed on a smartphone or other remote interface device for providing a merchandising interface for providing an interactive video experience.
Figure 9B:
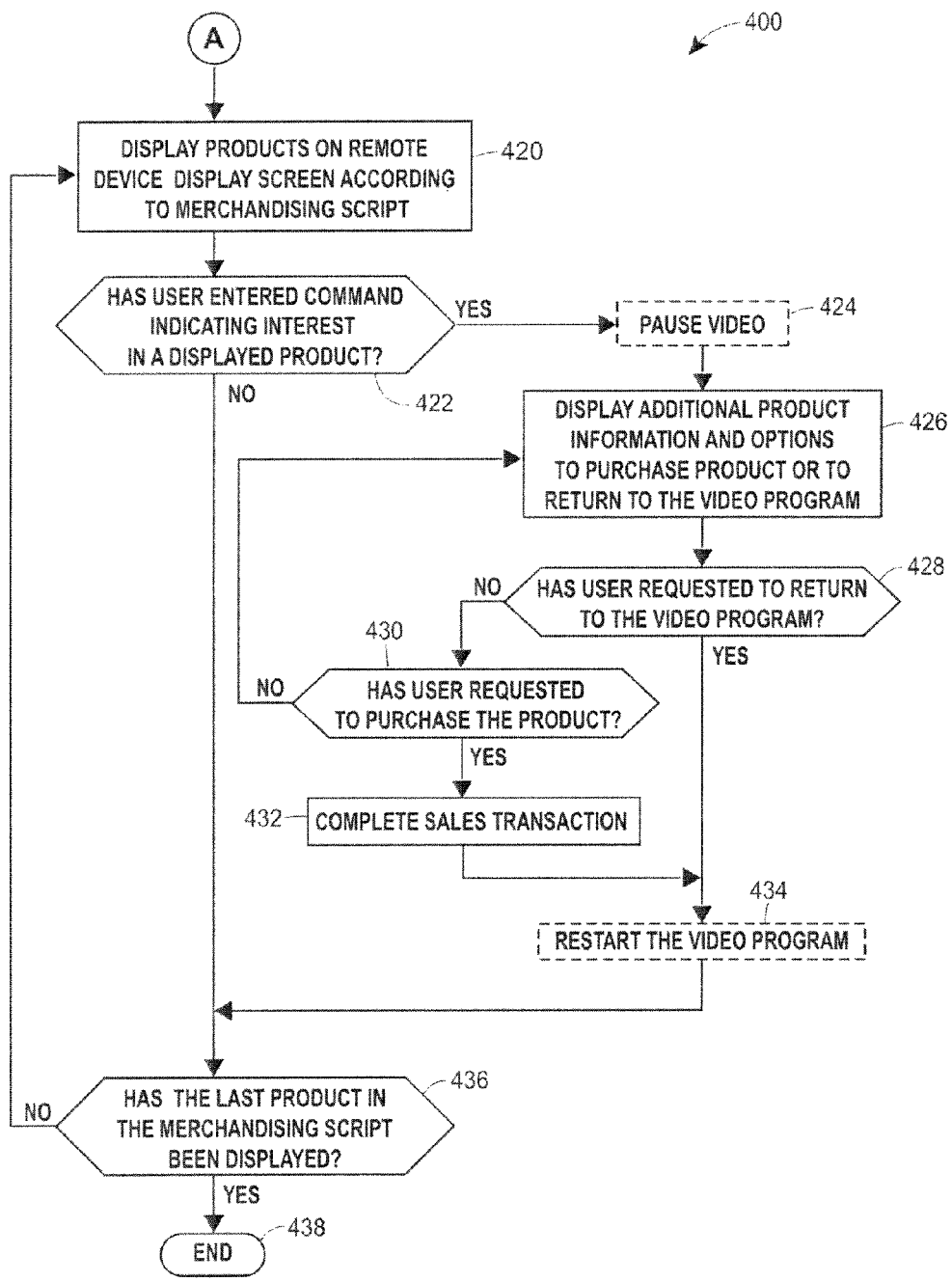

FIGS. 9A and 9B show a flow chart 400 describing the operation of a software application executed on a smartphone or other remote interface device for providing a merchandising interface according to an embodiment of a system for providing an interactive video experience. Operation of the application begins when the user launches the application at 402. The user may launch the application by selecting an icon representing the application displayed on the smartphone's display screen, or by some other mechanism provided by the smartphone's operating system for launching applications. Once the application has been launched, the application determines what video programs are available for viewing at 404. This step may take on a number of different forms depending on how the video programs are provided to the video display device. If the video programs are provided from a DVR or some other video storage device under the user's control, for example, the application may be adapted to interrogate the user's DVR (via a Bluetooth or Wi-Fi connection, or via the internet, for example) in order to obtain a list of the programs stored on the user's DVR. Alternatively, if the user is viewing video programs that are being broadcast over the public airways or via a cable TV network, the application may utilize information from the smartphone's GPS system to determine the users geographical position. The application may forward this information to the merchandising server 306, and based on the user's location and the current time, the merchandising server 306 may access scheduling information for broadcast stations or cable operators serving the user's geographical area to identify video programs that are being presented at that time and location. In addition to identifying the video programs that are being presented at that particular time and location or which have been recorded to a DVR, the merchandising server must also determine which of the available video programs and have been chronologically indexed and for which a merchandising script has been prepared. (The interactive system can only operate in conjunction with video programs that have been chronologically indexed and for which the featured products are being offered for sale.) Once the list of available chronologically indexed programs has been determined, the merchandising server 306 may send a program listing to the smartphone 304 via the internet.

Figure 10:
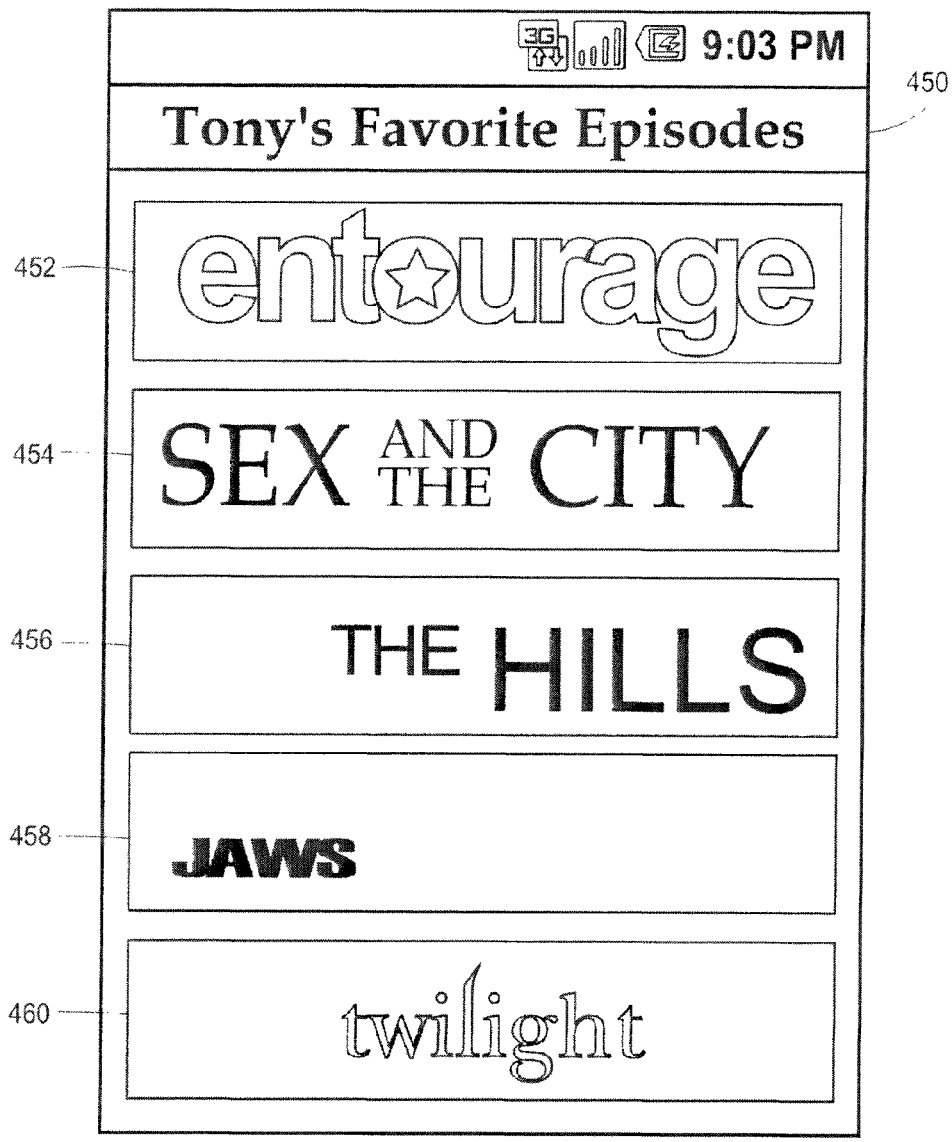
FIG. 10 is a diagram showing a program listing displayed on a smartphone display.

Upon receiving the program listing (either from the user's DVR, the merchandising server or some other source) the merchandising interface application displays the list of available programs at 406. An example of such a program listing displayed on a smartphone display screen 450 is shown in FIG. 10. As can be seen, the smartphone display screen 450 shows a listing of five video offerings: Entourage 452; Sex and the City 454; The Hills 456; Jaws 458; and Twilight 460. If the list of available programs exceeds the number of programs that can be listed on display screen at one time, additional listings can be viewed by scrolling up and down the list using conventional scrolling techniques available on most commonly available smartphone or computer interfaces. If the smartphone's display is a touch screen display, the user may select one of the listed video programs by tapping an icon representing the desired program, otherwise in the case of a non-touch screen display, the user may select a program using the smartphone's input buttons 354 to highlight and select the desired program.

Returning to FIG. 9A, the merchandising interface application determines whether the user has made a selection at 408. If not, the merchandising interface application continues to display the list of available programs until the user either makes a selection or exits the application, or the application times out. When the user does make a selection, the merchandising interface application communicates the selection to the merchandising server 306 at 410. Upon receiving the user's selection, the merchandising server 306 downloads the merchandising script and at least some catalog information for the products featured in the selected program to the smartphone 350. The smartphone 350 receives the merchandising script and the catalog information and stores it in the smartphone's memory 332.

The merchandising interface application then synchronizes the merchandising interface timer with the running time of the selected video program at 414. If the video program is being supplied from the user's DVR or some other local video storage device, this may simply entail starting the video program and the merchandising interface timer at the same time, or if the video program is being broadcast independently by a third party, it may require synchronizing the merchandising interface application time with the scheduled start time of the selected video program or with the elapsed running time of the video program if the presentation of the video program is already in progress.

The merchandising interface application identifies the products featured in the video program according to the merchandising script at 416, and pulls information about the featured products from the merchandising server 306 in the order that the featured products appear in the selected video program at 418. Because of possible memory constraints on the smartphone 350, it may not be possible to store catalog information for all of the products featured in the video program on the smartphone at one time. In this case, the merchandising interface application must identify featured products in advance and fetch the data associated with each featured product on an as needed basis from the merchandising server 306 before the featured products are to be displayed on the smartphone's display screen according to the merchandising script. Therefore, the merchandising interface application may implement a "greedy fetch" algorithm which pulls as much catalog data as it can store from the merchandising server on an as needed basis. For example, if at a certain point during the presentation of the video program the user's smartphone has enough memory available to store product data for the next three featured products to be displayed according to the merchandising script, the merchandising interface application may contact the merchandising server 306 to pull product information for all three of the next three featured products, even though the second and third products may not be scheduled to be displayed for several minutes. The "greedy fetch" algorithm is executed throughout the presentation of the video program to ensure that product information regarding the products featured in the video program is on hand and may be displayed at the appropriate time according to the merchandising script.

Once the merchandising interface application timer has been synchronized with the presentation of the video program and the product information for at least the first one of the featured products has been received, the merchandising interface application begins displaying the product information for the featured products according to the merchandising script at 420. As the information for each product is displayed, the merchandising interface application determines whether the user has entered a command (such as tapping an image of the featured product on the smartphone's touch screen display.) indicating an interest in the product at 422. If the video program is being provided from a video source device, such as a DVR or cable set-top-box or the like, that implements a communication protocol over which the merchandising interface application can communicate with the video source device to control the presentation of the video program on the video display device the merchandising interface application may pause the presentation of the video at 424. For example, if the video program is being provided from a DVR or other local video storage device, the merchandising interface application may use a communication protocol common to both the smartphone and the DVR to issue basic video control commands to the local device for starting, stopping, fast forwarding, reversing and pausing the video program via a Bluetooth, wi-fi, or some other wireless communication link. Similarly, if the video is being received via broadcast of cable channel and a DVR is available, the merchandising interface application may cause the DVR to begin recording the video program while the user investigates the selected product, and then resume playing the video program from the DVR recording once the user has completed a purchase transaction for the desired product or otherwise indicated a desire to return to the presentation of the video program. Otherwise, if no mechanism is available for storing and playing back received video, the step of pausing the video may be omitted and the video program may continue to be presented while the user investigates the selected product and possibly enters a transaction to purchase the selected product.

Figure 11:
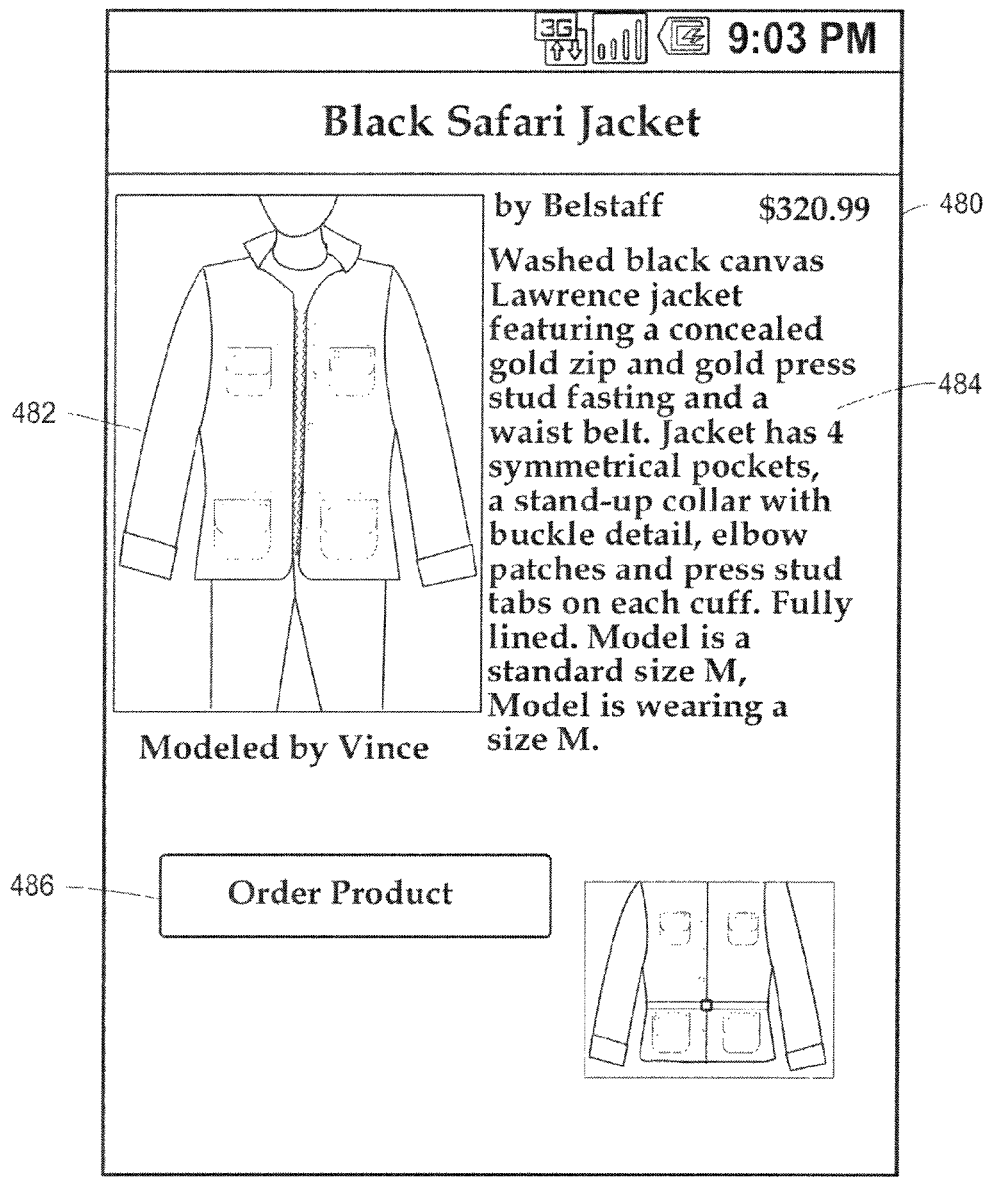
FIG. 11 is a diagram showing a detailed description page for a featured product selected by a user displayed on a smartphone display.
Figure 12:
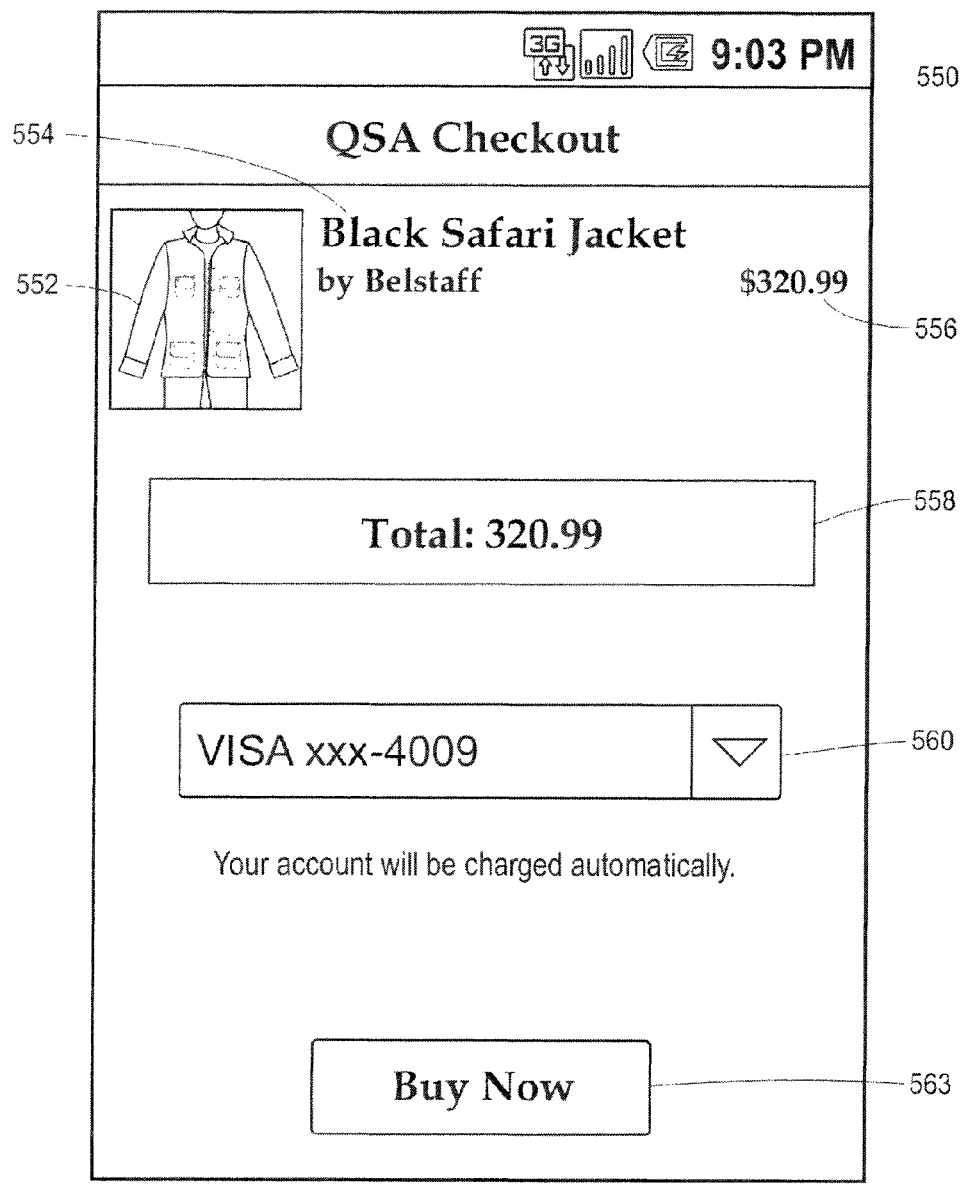
FIG. 12 is a diagram showing a sales transaction page displayed on a smart phone display.

Regardless of whether or not the video program is paused at 424, the merchandising interface application displays additional information about the selected product on the smartphone's display screen at 426, along with options for purchasing the displayed product and returning to the presentation of the video program. For example, FIG. 11 shows a merchandising interface page 500 that may be displayed on the smartphone's display screen when the user selects one of the featured products displayed by the merchandising interface at the step 428. In this case the merchandising page 500 shows an enlarged image of the product 502, and a more detailed description of the product 504. The interface page 500 further includes touchscreen buttons 508, 510 for ordering the product 508 or to return to the video program 510. At 428 the merchandising interface application determines whether the user has selected the option to return to the video program. If so, the merchandising interface application issues the appropriate commands to resume the presentation of the video program 434. (Of course, the step of resuming the presentation of the video program at 434 is performed only in instances in which the presentation of the video program was paused at 424.) If at 428, however, the user has not requested to return to the video program, the merchandising interface application determines whether the user has selected the option to purchase the selected product at 430. If so, the merchandising interface program contacts the merchandising server 306 via the network 308 and downloads a sales transaction page or pages, and presents an purchase page (or pages) on the smartphone's display screen that allows the user to complete a transaction to purchase the selected item at 432. FIG. 12 shows an example of a sales transaction page 550 that may be presented by the merchandising interface program on the smartphone's display screen. The sales transaction page 550 includes a picture of the product 552, the name of the product 554, and the price 556. The sales transaction page 550 may further include a drop down menu 560 for entering or changing credit card or other payment information, and a "Buy Now" button 563 for making the purchase. Upon completion of the sales transaction the merchandising interface application issues the appropriate commands to resume the presentation of the video program 434. (Again, this step is performed only in instances in which the presentation of the video program was paused at 424.

At 436 the merchandising interface application determines whether the last featured product identified in the merchandising script has been presented on the smartphone's display screen, and whether the runtime of the video program has expired. If not, operation of the merchandising interface application returns to 420 where information about the next featured product is presented on the smartphone's display screen in accordance with merchandising script. If, however, the merchandising interface application determines at 436 that product information for the last product has been displayed and that the running time of the video program has expired, the process ends at 438.

According to another embodiment of a system for providing an interactive video experience, customer interactions with the system may be specifically tailored to the specific video images being displayed to the viewer at the time the interactions are provided. According to this embodiment, a video stream may produced for providing video content to a viewer. The video stream is chronologically indexed to identify various features of the video content that are displayed at specific times when the video stream is presented to a viewer. Various visual objects or icons may be generated to be displayed simultaneously with the video content when the video stream is reproduced for the viewer. The visual objects may be selected and displayed to correspond to various features of the video content. For example, a particular visual object may be selected to be displayed during a particular scene included in the video content, or when a particular product, character or actor is on the screen. The visual objects may be displayed as translucent overlays located directly over the video images displayed when the video stream is reproduced, and/or the visual objects may displayed in an area framing the video images displayed when the video stream is reproduced. In another alternative, the visual objects may be displayed in a scrolling manner across a portion of the video images, or above, below, or beside the video images.

The visual objects may provide a mechanism allowing a viewer to interact with a party associated with providing the video content to the viewer. For example, a visual object may provide a mechanism allowing the customer to interact with a sponsor of the video content (e.g., an advertiser who has paid to have its logo displayed during a portion of the video content). In another example, the visual object may provide a mechanism whereby the viewer may interact directly with the producer of the video content such that the viewer's interaction may be incorporated into the images that are being displayed. In this case, the user's interactions may be incorporated directly within the video content itself, or may affect the visual objects that are displayed in conjunction with the video content. The customer interactions with a party associated with providing the video content may take on any number of different forms. For example, a visual object displayed in conjunction with a portion of the video content may present a telephone number to a call center operated by a party associated with providing the video content, or a number directed toward a Small Message Service (SMS) gateway may be displayed so that the viewer may send a text message to the party associated with providing the video content. Still other alternatives include associating executable commands with the visual objects such that by selecting the visual objects via a cable TV remote control device or a computer mouse, for example, a message is sent to the party associated with providing the video content via a cable TV network reverse communication channel or the Internet. Of course other mechanisms for communicating with a party associated with providing the video content may also be adopted.

By displaying visual objects that correspond to the particular features of the video images as they are being displayed, the customer's interactions can be highly correlated with the video content. For example, a portion of a video program may be sponsored by a particular advertiser. That advertiser's logo may be displayed on the user's television screen, computer monitor, mobile phone or other video viewing platform along with the video images generated when the portion of the video content sponsored by the advertiser is being displayed. During the period when the advertiser's logo is displayed, the viewer may be provided with a mechanism to interact directly with the advertiser. Such interactions may include, for example, opportunities to purchase products offered by the advertiser. What is more, the customer interactions may be correlated specifically with the particular video images that are being presented to the viewer at the time of the interaction. Thus, if the advertiser secured a product placement in the program being presented to the viewer, the chronological indexing of the video stream allows the advertiser to know exactly what portion of the program was being displayed to the viewer at the time of the viewer interaction. Even more significantly, the viewer interactions available to the user may be tied directly to what is being displayed at any particular point during the playback of the video content. Thus, a viewer interaction made available to the viewer may be limited to an opportunity to purchase the particular product that the advertiser has placed in the video content and which is being displayed in the video playback during the time in which the interaction is available.

Figure 13:
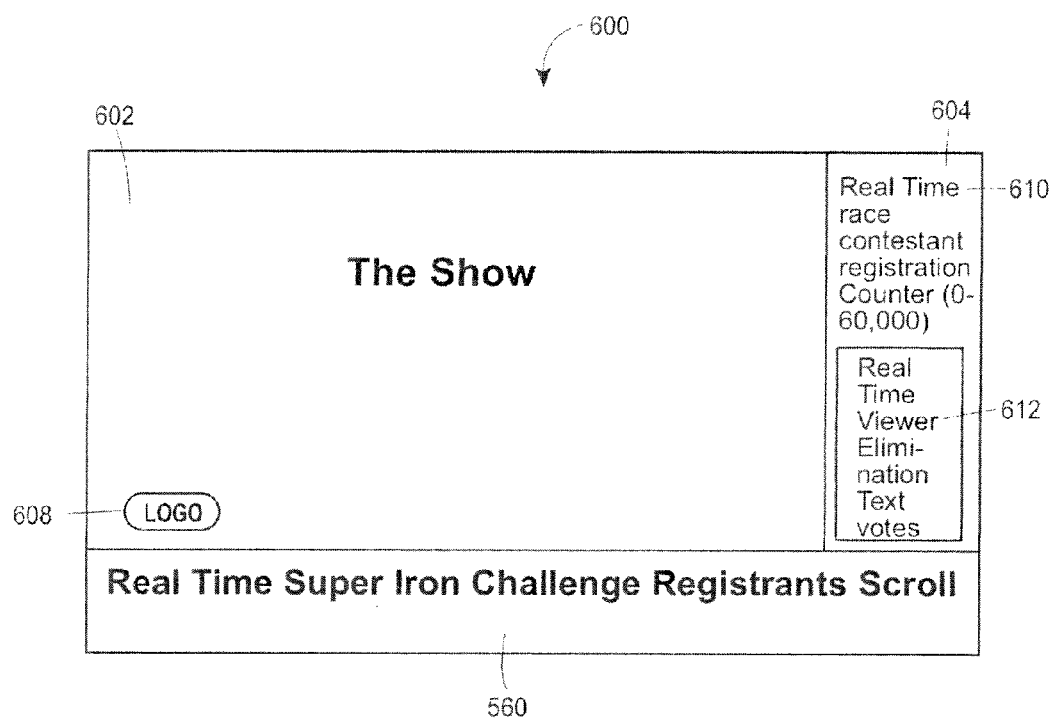
FIG. 13 is a diagram showing a video display employed in an interactive video system.

FIG. 13 shows an example of a video display 600 that may be employed in an interactive video system. The video display 600 includes a video content window 602, a window framing region 604, and a scrolling text bar 606. The particular arrangement of the video display window 600 is for illustration only. Alternate arrangements are also possible. For example, the window framing region 604 could be located at the left or right side of, or on the top or bottom of the video content window 602, or the window framing region 604 could extend down both sides of the video content window, or across both the top and bottom of the video content window 602, or some combination of the left and right sides and the top and bottom of the video content window 602, etc. Similarly, the scrolling text bar 606 could alternately be located at the top of the video display, or could directly overlay the video content window 602. Translucent icons 608 may be displayed directly over video content displayed in the video content window 602. Similarly, visual objects 610, which may comprise visual icons, product images, text, instructions for contacting a party associated with producing the video, etc, may be displayed in the window framing region 604.

According to an embodiment of a system for providing an interactive video experience, the video content displayed in the video content window 602 may relate to a "reality" television show that invites audience participation. For example, contestants in the reality TV show may be living together and training to participate in an extreme sports sporting event, or some other athletic competition. The final sporting event may be open to the general public and the interactive video experience provided by the present system may be employed for registering race participants from among the general viewership of the reality program. The interactive experience may also include receiving, tallying, and displaying audience votes for eliminating contestants from the reality TV show. In this case, an advertiser logo 608, or multiple advertiser logos 608 may be displayed as translucent video overlays in the video content window 602. A visual object 610 displayed in the window framing region 604 may correspond to a real-time registration count that displays the number of contestants from the general public who have registered to participate in the final athletic competition at the end of the reality TV show. A second visual object 612 displayed in the window framing region 604 may correspond to elimination vote tallies from audience members voting to eliminate one or more cast members from the reality TV show. Finally, the scrolling text bar 606 may be employed to scroll the names of audience members who have registered to participate in the final athletic competition associated with the reality TV show.

According to another embodiment of a system for providing an interactive video experience, viewers are provided an opportunity to purchase products included within the video content displayed in the video content window 604. According to this embodiment, visual objects 610, 612 are displayed in the window framing region 604 when products corresponding to the visual objects are displayed in the video content displayed in the video content window 602. The visual objects 610, 612 may comprise interactive icons allowing the customer to initiate a transaction to purchase the product represented by the visual object, or may provide instructions for the viewer to contact a supplier to order the product. For example, suppose the video content being displayed in a the video content window is a spy movie, and a new model of a popular sports car is prominently featured in the movie. An icon of the sports car may be presented in the window framing region 604 accompanied by the legend "Buy the new XX Sport Coupe now!" The icon may provide a direct link to a dealer selling XX Sport Coupe, or may provide a phone number to a call center established to take orders for the XX Sport Coupe, etc. Also the brand logo for the XX Sport Coupe could be displayed as a translucent icon 608 directly within the video content window 602 whenever the XX Sport Coupe is on screen.

The interactive viewing experience disclosed herein could be applied to sell nearly any item for which a product placement has been obtained. In fact, it can even be applied in cases where no formal product placement has been agreed upon. For example, it may be applied to live broadcasts or events that are recorded live for rebroadcast at a later time. Outfits worn by celebrities on their way to an awards show, for example, could be offered for sale, or other less expensive pieces in the designer's line of clothing could be offered when a starlet wearing the designer's dress is shown crossing the red carpet, and so forth.

An important component of the interactivity provided by the present interactive video system is the chronological indexing of the video stream and identifying when, i.e. during which portions of the reproduced video stream, the various products will be displayed to the viewer as the viewer consumes the video content. Knowing when different products or other features of the video content will be displayed to the viewer allows viewer interactions to be precisely tailored to the events occurring on the screen.

Figure 14:
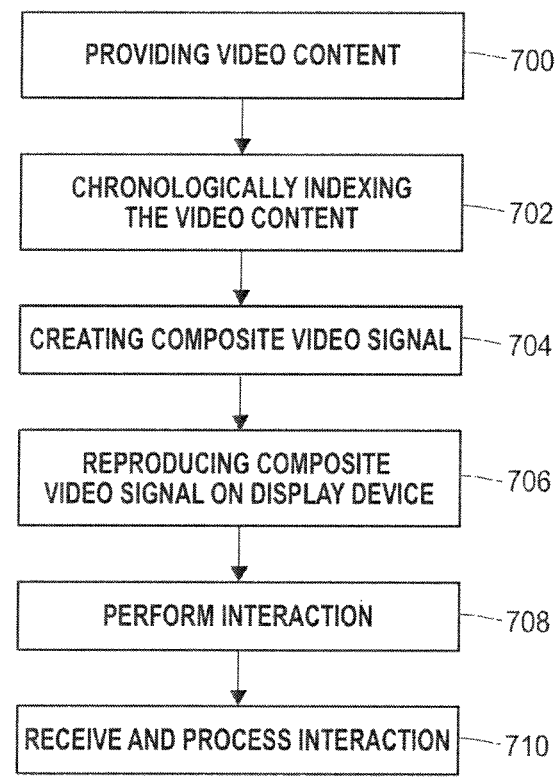
FIG. 14 is a block diagram illustrating a method for providing an interactive video experience.

FIG. 14 is a block diagram illustrating a method for providing an interactive video experience. The method begins by providing video content 700. Once the video content has been produced it is chronologically indexed 702 to determine the playback times during which various features (e.g. scenes, video segments, products, characters, actors etc.) are displayed. Next, a composite video signal is created 704. The composite video signal includes the video stream of the original video content plus additional video data for including visual objects that are to be displayed at specific playback times of the original video content. When displayed for the viewer, the visual objects provide a mechanism or user interactions. The composite video signal is then reproduced on a viewer's display device 706. The user then performs an interaction according to the user interaction mechanism provided by one of the visual objects included in the composite video signal 708. The method concludes when the user interaction is received and processed 710.

It should be noted that the systems and methods for providing an interactive video experience disclosed herein are independent of the platform over which the video content is distributed. The systems and methods disclosed herein may be readily adapted to broadcast video, cable TV, digital broadcasts, satellite feeds Internet distribution, even DVD or other portable storage media.

The present invention has been described with reference to specific examples. These examples are intended to be illustrative only and should not be read as limiting the invention in any way. It will be apparent to those of ordinary skill in the art that changes, additions or deletions may be made to the disclosed embodiments without departing from the spirit and scope of the invention.

What is claimed is:

1. A merchandising system for presenting and selling one or more products to consumers, the merchandising system comprising:
   a video display device adapted to present a video program including video images of the one or more products appearing at specific elapsed program run times within the video program;
   a remote interface device having a display, a processor and a memory, the memory storing a software application to be executed by the processor for presenting a merchandising interface on the remote interface device, the memory also storing a merchandising script corresponding to the video program, but that is otherwise independent of the video program, identifying the elapsed program run times at which the video images of the one or more products appear within the video program, and product information related to one or more products; and
   a synchronizing timer that operates independently of, but simultaneously with, the video program presentation once initially synchronized with the video program presentation, said synchronizing timer configured to be started at a beginning time of the video program so that the synchronizing timer measures an elapsed program running time for synchronizing execution of the merchandising script with the presentation of the video program on the video display device and the merchandising script runs on the remote device simultaneously with the video program running on the video display device;
   wherein the remote interface device displays the product information about the one or more products at times corresponding to elapsed program run times at which the video images of the one or more products appear within the video program according to the merchandising script during presentation of the video program;
   a merchandising server, wherein the remote interface device comprises a network enabled device adapted to communicate with the merchandising server via a network, wherein a user launches the software application and the software application determines what video programs are available for viewing and communicates with the merchandising server, and the merchandising server determines which of the available video programs have been chronologically indexed and for which a merchandising script has been prepared, and once the list of available chronologically indexed video programs has been determined, the merchandising server sends a listing of available and chronologically indexed video programs to the remote interface device via the network and transmits the merchandising script and product information to the remote interface device based on a user selection from the listing of available and chronologically indexed video programs;
   said merchandising interface providing a commerce page on the remote interface device in response to the user selection, said commerce page allowing the user to purchase one of the products included in the video images presented in the video program; and
   said software application, after the user has accessed the commerce page to purchase one of the products included in the video images presented in the video program, determining independently of the video program through use of the elapsed program running time from the synchronizing timer whether product information about a last product identified in the merchandising script has been presented on the remote interface device and, if not, using the elapsed program running time from the synchronizing timer to display product information about a next product included in the video images presented in the video program according to the merchandising script.

2. The merchandising system of claim 1 wherein the remote interface device comprises one of: a personal computer, a laptop computer, a slate computer, a wireless telephone, a cellular telephone, a smartphone, a feature phone, a portable music player, a portable video player or a personal digital assistant device.

3. The merchandising system of claim 1 wherein the timer is adapted to be started at a time associated with the beginning of the presentation of the video program to synchronize execution of the merchandising script with the presentation of the video program.

4. The merchandising system of claim 1 wherein the timer is adapted to be manually started at the beginning of the presentation of the video program is started.

5. The merchandising system of claim 1 further comprising a video storage device, wherein the video program is stored on the video storage device and the merchandising timer is synchronized with the running program time of the video program corresponding to a request to play the video program from the video storage device.

6. The merchandising system of claim 1 wherein the merchandising interface is adapted to provide video program viewing options to a user, receive user input for selecting one of the video program viewing options, and communicate a user selection to the merchandising server.

7. The merchandising system of claim 6 wherein the merchandising server is adapted to store one or more merchandising scripts each merchandising script corresponding to one of the one or more video programs, and to send a merchandising script corresponding to the video program selected by the user to the remote interface device along with synchronization data for synchronizing the merchandising timer with a presentation of the video program.

8. The merchandising system of claim 7 wherein the merchandising server is adapted to store a product catalog identifying and storing information about the products identified in the merchandising scripts stored on the merchandising server and wherein the merchandising server is adapted to send information about the products to the remote interface device in response to a request for the product information received from the remote interface device.

9. The merchandising system of claim 8 wherein the application is adapted to request product information from the merchandising server for products identified in the merchandising script corresponding to the presentation of the video program at a time in advance of a time identified in the merchandising script at which the product information is to be displayed by the remote interface device in accordance with the merchandising script.

10. The merchandising system of claim 1 wherein the software application when executed by the processor is further adapted to provide an interface page allowing a user to purchase one of the products included in the video images presented in the video program.

11. The merchandising system of claim 1 wherein the software application is further adapted to receive a user input selecting one of the products included in the video images presented in the video program and to store information about the selected product so that the user may view the information about the selected product and purchase the selected product at a later time.

12. The merchandising system of claim 1 wherein the software application determines whether the user has made a selection from the listing of available and chronologically indexed video programs.

13. The merchandising system of claim 12 wherein if a selection has not been made by the user, the software application continues to display the list of available programs until the user either makes a selection or exits the application, or the application times out.

14. The merchandising system of claim 12 wherein if a selection has been made by the user, the software application communicates the selection to the merchandising server and upon receiving the user's selection, the merchandising server downloads the merchandising script and at least some catalog information for the products featured in the selected program to the remote interface device and the remote interface device receives the merchandising script and the catalog information and stores it in the memory.

15. The merchandising system of claim 1 wherein the software application determines what video programs are available for viewing based on the user's location and the current time.

16. A merchandising method for selling one or more products appearing in a video program, the method comprising:
creating a merchandising script corresponding to the video program, but that is otherwise independent of the video program, the merchandising script identifying one or more product display times corresponding to elapsed video program running times at which images of the one or more products appear in the video program when the video program is presented to a viewer on a video display device;
providing a synchronizing timer configured to be started at a beginning time of the video program so that the synchronizing timer measures an elapsed program running time for synchronizing the merchandising script with a presentation of the video program and the merchandising script and video program run simultaneously;
launching a software application that determines what video programs are available for viewing, the software application communicating with a merchandising server that determines which of the available video programs have been chronologically indexed and for which a merchandising script has been prepared, wherein once the list of available chronologically indexed video programs has been determined, the merchandising server sends a listing of available and chronologically indexed video programs to the remote interface device via the network;
transmitting the merchandising script and product information for the one or more products from the merchandising server to a remote interface device via a network based on a user selection from the listing of available and chronologically indexed video programs;
causing product information for the one or more products to be displayed on the remote interface device at the product display times according to the merchandising script such that the product information for the one or more products are displayed on the remote interface device at times substantially corresponding to the elapsed video program running times at which the images of the one or more products appear in the video program during presentation of the video program;
providing a sales interface allowing a user to purchase one or more of the products via the remote interface device;
wherein providing a sales interface allowing a user to purchase one or more of the products via the remote interface device comprises providing a link to a merchandising server adapted to initiate a sales transaction for the one or more of the products via the remote interface device;
after a user has accessed the link to the merchandising server to initiate the sales transaction for one or more of the products having images appearing in the video program, determining independently of the video program through use of the elapsed program running time from the synchronizing timer whether a last product corresponding to a last product display time in the merchandising script has been displayed on the remote interface device and, if not, using the elapsed program running time from the synchronizing timer to display a next product having images appearing in the video program according to the merchandising script.

17. The merchandising method of claim 16 wherein synchronizing the merchandising script with the presentation of the video program comprises starting execution of the merchandising script at a time substantially corresponding to a start of the presentation of the video program.

18. The merchandising method of claim 17 wherein starting the execution of the merchandising script at a time substantially corresponding to the start of the presentation of the video program comprises starting the execution of the merchandising script according to a scheduled broadcast presentation time of the video program.

19. The merchandising method of claim 17 wherein starting the execution of the merchandising script at a time substantially corresponding to the start of the presentation of the video program comprises starting the execution of the merchandising script at substantially the same time as starting playback of the video program from a video storage device.

20. The merchandising method of claims 17 wherein starting the execution of the merchandising script at a time substantially corresponding to the start of the presentation of the video program comprises starting the execution of the merchandising script at a time substantially corresponding to the same time a starting a streaming video session.

21. The merchandising method of claim 16 wherein the video program comprises a live broadcast of an event and wherein creating the merchandising script corresponding to the video program comprises identifying products as they appear in the live broadcast.

22. The merchandising method of claim 16 wherein the remote interface device comprises one of a personal computer, a laptop computer, a slate computer, a cellular telephone, a smartphone, a feature phone, a portable music player, a portable video player, or a personal digital assistant.

23. The merchandising method of claim 16 wherein the software application determines whether the user has made a selection from the listing of available and chronologically indexed video programs.

24. The merchandising method of claim 23 wherein if a selection has not been made by the user, the software application continues to display the list of available programs until the user either makes a selection or exits the application, or the application times out.

25. The merchandising method of claim 23 wherein if a selection has been made by the user, the software application communicates the selection to the merchandising server and upon receiving the user's selection, the merchandising server downloads the merchandising script and at least some catalog information for the products featured in the selected program to the remote interface device and the remote interface device receives the merchandising script and the catalog information and stores it in the memory of the remote interface device.

26. A remote interface device for interacting with a video synchronized merchandising system, the remote interface device comprising:
  a display screen for presenting information to a user;
  one or more inputs for receiving user input commands; a processor;
  a memory;
  a network communication module adapted to communicate with a remote merchandising server over a network;
  a merchandising interface application including a synchronizing merchandising interface timer stored in the memory and adapted to be executed by the processor, the merchandising application adapted to execute a merchandising script corresponding to a video program, but that is otherwise independent of the video program, and said synchronizing timer configured to be started at a beginning time of the video program so that the synchronizing timer measures an elapsed program running time and the merchandising script and video program run simultaneously where the merchandising script is synchronized by the synchronizing merchandising interface timer to a presentation of the video program on a separate video display device such that product information relating to products appearing in the video program is displayed on the display screen of the remote interface device at a time substantially corresponding to a time at which images of the products appear in the video program, where the synchronizing merchandising interface timer operates independently of the presentation of the video program, once initially synchronized with the presentation of the video program;
  said merchandising interface application determining what video programs are available for viewing and communicating with the with the remote merchandising server, the remote merchandising server determining which of the available video programs have been chronologically indexed and for which a merchandising script has been prepared, wherein once the list of available chronologically indexed video programs has been determined, the remote merchandising server sends a listing of available and chronologically indexed video programs to the remote interface device via the network;
  said merchandising interface application providing a commerce page on the remote interface device in response to a user selection from the listing of available and chronologically indexed video programs, said commerce page allowing the user to purchase one of the products appearing in the video program; and
  said merchandising interface application, after a user has accessed the commerce page to purchase one of the products appearing in the video program, determining independently of the video program through use of the elapsed program running time from the synchronizing timer whether product information about a last product identified in the merchandising script has been presented on the remote interface device and, if not, using the elapsed program running time from the synchronizing timer to display displaying product information about a next product appearing in the video program according to the merchandising script.

27. The remote interface device of claim 26 wherein the merchandising interface application, when executed by the processor, is further adapted to receive a list of available video programs from the remote server and to display the list on the display screen.

28. The remote interface device of claim 27 wherein the merchandising interface application, when executed by the processor, is further adapted to receive user input selecting one of the available video programs for viewing, communicate which video program has been selected to the remote server, and receive a merchandising script corresponding to the selected video program from the remote server.

29. The remote interface device of claim 28 wherein the merchandising interface application, when executed by the processor, is further adapted to receive synchronization data from the remote server for synchronizing execution of the merchandising script by the interface application with a presentation of the selected video program.

30. The remote interface device of claim 29 wherein the merchandising interface application, when executed processor, is further adapted to request and receive product information from the remote server relating to products identified in the merchandising script and to display the received product information on the display screen according to the merchandising script.

31. The remote interface device of claim 26 wherein the merchandising interface application, when executed by the processor, is further adapted to provide a link to a network resource for purchasing one or more products appearing in the video program.

32. A method of merchandising a plurality of products that appear in a video program, the method comprising:
    storing information about the products that appear in the video program in a memory device;
    creating a merchandising script identifying video program running times at which images of the products appear in a presentation of the video program, said merchandising script otherwise independent of the video program;
    providing a synchronizing timer configured to be started at a beginning time of the video program so that the synchronizing timer measures an elapsed program running time for synchronizing the merchandising script with a presentation of the video program on a video display device and the merchandising script and video program run simultaneously;
    launching a merchandising interface application stored in the memory device that determines what video programs are available for viewing based on the current time and a user's location, the merchandising interface application communicating with a merchandising server that determines which of the available video programs have been chronologically indexed and for which a merchandising script has been prepared, wherein once the list of available chronologically indexed video programs has been determined, the merchandising server sends a listing of available and chronologically indexed video programs to the remote interface device via the network;
    selecting a video program from the listing of available and chronologically indexed video programs;
    sending the merchandising script from a merchandising server to a remote interface device independent of the video program in response to the user selection;
    displaying information about the products according to the merchandising script on a remote interface device such that information about the products that appear in the video program is displayed at times corresponding to the video running times at which images of the products appear during the presentation of the video program;
    providing a sales interface allowing a user to purchase one or more of the products via the remote interface device;
    wherein providing a sales interface allowing a user to purchase one or more of the products via the remote interface device comprises providing a link to the merchandising server adapted to initiate a sales transaction for the one or more of the products via the remote interface device;
    after the user has accessed the link to the merchandising server to initiate the sales transaction for one or more of the products appearing in the video program, determining independently of the video program through use of the elapsed program running time from the synchronizing timer whether a last product corresponding to a last video program running time at which an image of a product last appears in the video program has been displayed on the remote interface device and, if not, using the elapsed program running time from the synchronizing timer to display a next product appearing in the video program according to the merchandising script.

33. The method of claim 32 wherein synchronizing the merchandising script with the presentation of the video program comprises starting execution of the merchandising script at a time substantially corresponding to a start of the presentation of the video program.

34. The merchandising method of claim 33 wherein starting the execution of the merchandising script at a time substantially corresponding to the start of the presentation of the video program comprises starting the execution of the merchandising script according to a scheduled broadcast presentation of the video program.

35. The merchandising method of claim 33 wherein starting the execution of the merchandising script at a time substantially corresponding to the start of the presentation of the video program comprises starting the execution of the merchandising script at substantially the same time as starting playback of the video program from a video storage device.

36. The merchandising method of claims 33 wherein starting the execution of the merchandising script at a time substantially corresponding to the start of the presentation of the video program comprises starting the execution of the merchandising script at substantially the same time as starting a streaming video session.

37. The method of claims 32 further comprising providing a sales interface allowing a user to purchase one or more of the products via the remote interface device.

38. The method of claim 37 wherein providing a sales interface comprises providing a link to a merchandising server adapted to initiate a sales transaction for the purchase of the one or more of the products via the remote interface device.

39. The method of claim 32 wherein the remote interface device comprises one of a personal computer, a laptop computer, a slate computer, a cellular telephone, a smartphone, a feature phone, a portable music player, a portable video player, or a personal digital assistant.

40. The merchandising method of claim 32 wherein the merchandising interface application determines whether the user has made a selection from the listing of available and chronologically indexed video programs.

41. The merchandising method of claim 40 wherein if a selection has not been made by the user, the merchandising interface application continues to display the list of available programs until the user either makes a selection or exits the application, or the application times out.

42. The merchandising method of claim 41 wherein if a selection has been made by the user, the merchandising interface application communicates the selection to the merchandising server and upon receiving the user's selection, the merchandising server downloads the merchandising script and at least some catalog information for the products featured in the selected program to the remote interface device and the remote interface device receives the merchandising script and the catalog information and stores it in the memory.

* * * * *